United States Patent
Ikeda et al.

(10) Patent No.: US 8,031,426 B2
(45) Date of Patent: Oct. 4, 2011

(54) THIN-FILM MAGNETIC HEAD HAVING MICROWAVE MAGNETIC EXCITING FUNCTION AND MAGNETIC RECORDING AND REPRODUCING APPARATUS

(75) Inventors: Hiroshi Ikeda, Tokyo (JP); Sayaka Hattori, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/700,278

(22) Filed: Feb. 4, 2010

(65) Prior Publication Data

US 2010/0208379 A1     Aug. 19, 2010

(30) Foreign Application Priority Data

Feb. 13, 2009   (JP) ................. 2009-030937

(51) Int. Cl.
G11B 5/02    (2006.01)
G11B 5/127   (2006.01)

(52) U.S. Cl. .......................... 360/59; 360/110
(58) Field of Classification Search .............. None
See application file for complete search history.

(56) References Cited

U.S. PATENT DOCUMENTS

| | | |
|---|---|---|
| 7,133,230 B2 | 11/2006 | Saga et al. |
| 7,791,838 B2 | 9/2010 | Sato et al. |
| 2007/0253106 A1 | 11/2007 | Sato et al. |
| 2008/0112087 A1 | 5/2008 | Clinton et al. |

(Continued)

FOREIGN PATENT DOCUMENTS

JP   11-016125   1/1999
(Continued)

OTHER PUBLICATIONS

Jimmy Zhu "Recording Well Below Medium Coercivity Assisted by Localized Microwave Utilizing Spin Transfer" Digest of MMM, 2005.

(Continued)

*Primary Examiner* — Daniell L Negron
*Assistant Examiner* — Regina N Holder
(74) *Attorney, Agent, or Firm* — Frommer Lawrence & Haug LLP

(57) ABSTRACT

A thin-film magnetic head having microwave magnetic exciting function, includes a write magnetic field production unit for producing, in response to a write signal, a write magnetic field to be applied into a magnetic recording medium, a line conductor of a microwave radiator of a plane-structure type, formed independent from the write magnetic field production means, for radiating, by feeding there through a microwave excitation current, a microwave band resonance magnetic field with a frequency equal to or in a range near a ferromagnetic resonance frequency $F_R$ of the magnetic recording medium, and two conductors separated from the line conductor in a direction perpendicular to a track-width direction of the thin-film magnetic head and parallel to an ABS of the thin-film magnetic head. The microwave radiator is an inverted micro strip waveguide having the line conductor and a ground conductor constituted by the magnetic recording medium. A section of the line conductor, perpendicular to the track-width direction has a rectangular shape. An aspect ratio B/A is within a region from 0.15 to 1.2 or within a region of 7 or more, where A is a length in a lateral direction of the line conductor, which is in parallel with the ABS and perpendicular to the track-width direction, and B is a length in a longitudinal direction of the line conductor, which is perpendicular to the air bearing surface.

10 Claims, 10 Drawing Sheets

U.S. PATENT DOCUMENTS

2008/0151436 A1    6/2008    Sato et al.
2010/0073804 A1 *  3/2010    Ikeda et al. .................... 360/59

FOREIGN PATENT DOCUMENTS

| | | |
|---|---|---|
| JP | 2000-323907 | 11/2000 |
| JP | 2001-250201 | 9/2001 |
| JP | 2002-008201 | 1/2002 |
| JP | 2002-299501 | 10/2002 |
| JP | 2007-522603 | 8/2007 |
| JP | 207-299460 | 11/2007 |
| WO | WO 03/010758 A1 | 2/2003 |
| WO | WO 2005/077043 | 8/2005 |

OTHER PUBLICATIONS

Japanese Office Action issued Oct. 26, 2010.

* cited by examiner

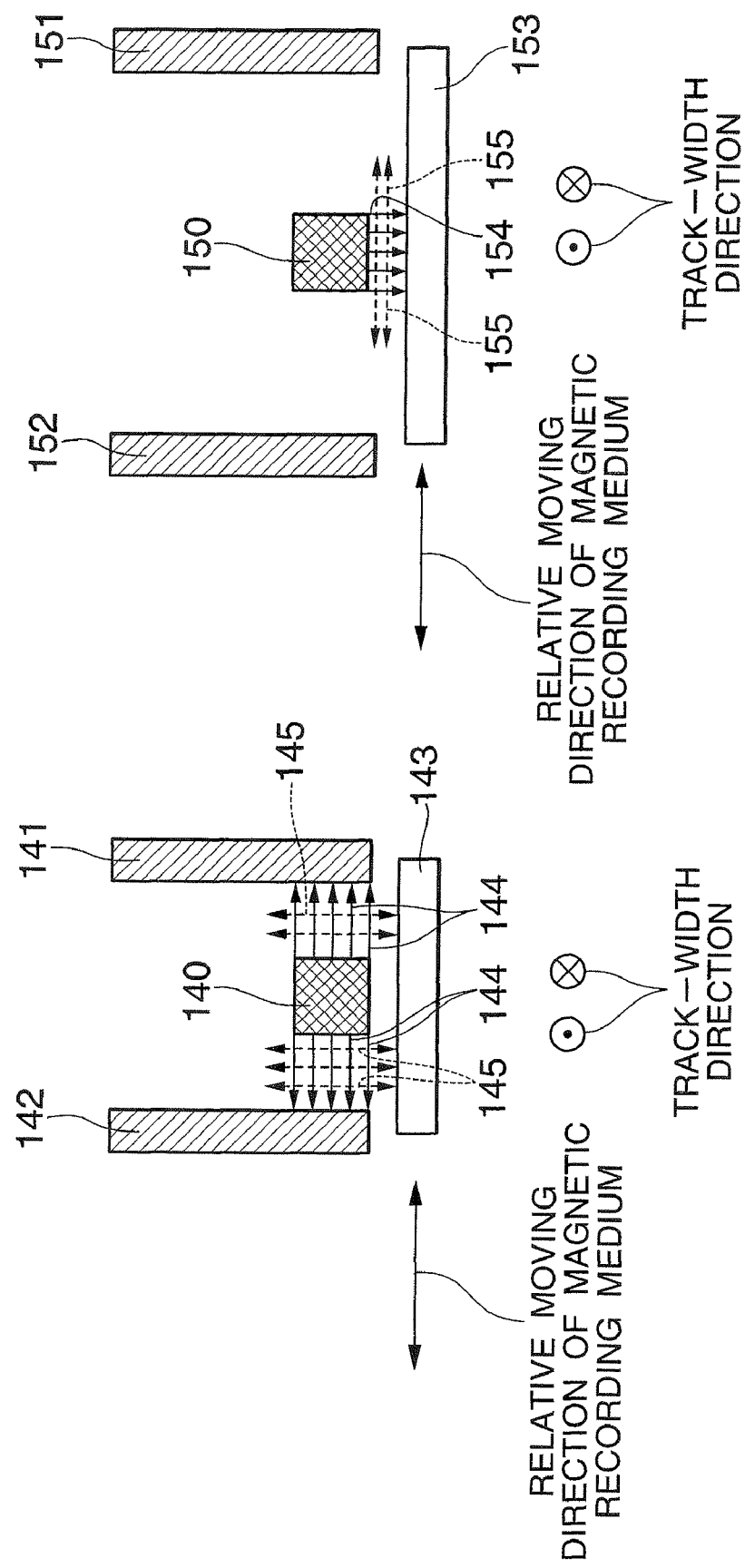

THIN-FILM MAGNETIC HEAD HAVING MICROWAVE MAGNETIC EXCITING FUNCTION AND MAGNETIC RECORDING AND REPRODUCING APPARATUS

PRIORITY CLAIM

This application claims priority from Japanese patent application No. 2009-030937, filed on Feb. 13, 2009, which is incorporated herein by reference.

BACKGROUND OF THE INVENTION

1. Field of the Invention

The present invention relates to a thin-film magnetic head having microwave magnetic exciting function for recording data signal onto a magnetic recording medium that has a large coercivity for thermally stabilizing the magnetization, and to a magnetic recording and reproducing apparatus with this thin-film magnetic head.

2. Description of the Related Art

With the demand for higher recording density of a magnetic recording and reproducing apparatus such as a magnetic disk drive apparatus, each bit cell in a magnetic recording medium for recording digital information has been miniaturized and, as a result, a signal detected by a read head element in the thin-film magnetic head sways due to such as thermal fluctuation. This causes deterioration in a signal-to-noise ratio (S/N), and in the worst case, the signal detected by the read head element may disappear.

It is effective for a magnetic recording medium adopted for the perpendicular magnetic recording scheme that is recently put to practical use to increase perpendicular magnetic anisotropy energy Ku of a magnetic recording layer in this recording medium. On the other hand, a thermal stabilization factor S that corresponds to the thermal fluctuation is represented by the following equation (1) and is necessary to have in general 50 or more:

$$S = Ku \cdot V / K_B \cdot T \quad (1)$$

where Ku is perpendicular magnetic anisotropy energy, V is a volume of crystal grains that form the recording layer, $k_B$ is the Boltzmann constant, and T is an absolute temperature.

According to the so-called Stoner-Wohlfarth model, an anisotropy magnetic field Hk and a coercivity Hc of the recording layer are represented as the following equation (2):

$$Hk = Hc = 2Ku/Ms \quad (2)$$

where Ms is a saturated magnetization of the recording layer.

The coercivity Hc increases with the increase in the perpendicular magnetic anisotropy energy Ku. In a normal recording layer, however, Hk is higher than Hc.

In order to perform desired inversion of magnetization in the magnetic recording layer in response to data sequence to be written, a write head element of the thin-film magnetic head is required to apply a recording magnetic field having a precipitous rising edge and a level up to about the anisotropy magnetic field Hk of the recording layer. In a hard disk drive (HDD) apparatus adopting the perpendicular magnetic recording scheme, a write head element with a single pole is used so that a recording magnetic field is applied perpendicular to the recording layer from an air-bearing surface (ABS) of the element. Since an intensity of this perpendicular recording magnetic field is proportional to a saturated magnetic flux density Bs of the soft magnetic material that forms the single pole, a material with a saturated magnetic flux density Bs as high as possible is developed and is put into practical use for the single pole. However, the saturated magnetic flux density Bs has the practical upper limit of Bs=2.4 T (tesla) from a so-called Slater-Pauling curve, and a recent value of the saturated magnetic flux density Bs of soft magnetic material closes to this practical upper limit. Also, in order to increase the recording density, the thickness and width of the single pole have to decrease from the present thickness and width of about 100-200 nm causing the perpendicular magnetic field produced from the single pole to more lower.

As aforementioned, due to the limit of recording ability of the write head element, high-density recording becomes difficult now. To overcome such problems, suggested is so-called thermal assisted magnetic recording (TAMR) scheme for recording a magnetic signal on a recording layer of the magnetic recording medium under conditions where the recording layer is irradiated by a laser beam for example to increase the temperature and to lower the coercivity Hc of the magnetic recording layer.

Japanese patent publication No. 2001-250201 discloses a TAMR technique in which electrons are radiated to a magnetic recording medium from an electron radiation source to heat a recording part in the magnetic recording medium so that the coercivity Hc is lowered and thus it is possible to record magnetic information on the medium using a magnetic write head.

U.S. Pat. No. 7,133,230 B2 discloses another TAMR technique in which a laser beam from a semiconductor laser element formed in a perpendicular magnetic recording head is irradiated to a scattering member or near-field light probe formed in contact with a main pole of the head so as to produce a near-field light, and the produced near-field light is applied to the magnetic recording medium to heat it and rise the temperature.

However, there are various difficulties and problems in these TAMR techniques. For example, (1) a structure of the thin-film magnetic head becomes extremely complicated and its manufacturing cost becomes expensive because the head has to have both a magnetic element and an optical element, (2) it is required to develop a magnetic recording layer with a coercivity Hc of high temperature-dependency, (3) adjacent track erase or unstable recording state may occur due to thermal demagnetization during the recording process.

Recently, in order to increase sensitivity of a giant magnetoresistive effect (GMR) read head element or a tunnel magnetoresistive effect (TMR) read head element, study of spin transfer in electron conductivity is made active.

US patent publication Nos. 2007/0253106 A1 and 2008/151436 A1, and J. Zhu, "Recording Well Below Medium Coercivity Assisted by Localized Microwave Utilizing Spin Transfer", Digest of MMM, 2005 disclose application of this spin transfer technique to the inversion of magnetization in a recording layer of a magnetic recording medium so as to reduce a perpendicular magnetic field necessary for the magnetization inversion.

According to this scheme, an alternating magnetic field of high frequency is applied to the magnetic recording medium in a direction parallel to its surface together with the perpendicular recording magnetic field. The frequency of the alternating in-plane magnetic field applied to the magnetic recording medium is an extremely high frequency in the microwave frequency band such as several GHz to 40 GHz, which corresponds to a ferromagnetic resonance frequency of the recording layer. It is reported that, as a result of simultaneous application of the alternating in-plane magnetic field and the perpendicular recording magnetic field to the magnetic recording medium, a perpendicular magnetic field necessary for the magnetization inversion can be reduced to about 60% of the anisotropy magnetic field Hk of the recording layer. If this scheme is put in practical use, it is possible to increase the anisotropy magnetic field Hk of the recording layer and thus it is expected to greatly improve the magnetic recording density without utilizing the complicated TAMR system.

However, according to the conventional technique, since the microwave magnetic field radiation means consists of a write coil wound around a magnetic body or of an individual sub-coil separately formed from the write coil, if a frequency of a microwave signal to be applied more increases, radiation of the microwave magnetic field will occur at a part of the write coil or the sub-coil itself and thus it is impossible to radiate microwave magnetic field toward the magnetic recording medium even when the power supply is increased. Therefore, if the frequency of the microwave signal to be applied more increases, it is quite difficult to increase the anisotropy magnetic field Hk of the recording layer.

The applicant has already proposed a method using a plane-structure waveguide such as a coplanar waveguide (CPW) or an inverted micro strip waveguide (I-MLIN) as for a microwave magnetic field emission means in the microwave-assisted magnetic recording system (for example, Japanese Patent Application No. 2008-242400, filed on Sep. 22, 2008).

According to this method, because a distance between a ground conductor or a grand electrode and a line conductor or a signal electrode minimizes, a strong high-frequency electric field or a strong high-frequency magnetic field can be obtained. This operation uses Coulomb's law in charge distribution, in which the electric field E increases inversely proportional to square of distance r between the electrodes, that is, $E=kQ/r^2$, wherein E is an electric field, Q is an electric charge, k is a constant of proportion, and r is a distance between the electrodes. In other words, using is that a strong electric field and magnetic field can be provided in proportion to the square of a distance when the distance minimizes.

FIGS. 14a and 14b illustrate configurations of CPW and I-MLIN as a microwave magnetic field emission means in the microwave-assisted magnetic recording system, respectively. Both of FIGS. 14a and 14b indicate in sections that are perpendicular to the track-width direction of a thin-film magnetic head. Therefore, right and left directions in the figures correspond to the relative moving direction of a magnetic recording medium, and a perpendicular direction to a plane of the figures corresponds to the track-width direction.

In FIG. 14a, reference numeral 140 denotes a line conductor of CPW, 141 and 142 denote a main pole layer and an auxiliary pole layer of a magnetic write head element arranged at top and bottom side (both sides in FIG. 14a) in a laminated direction of the line conductor 140, and 143 denotes a magnetic recording medium, respectively. In this configuration, the magnetic recording medium 143 is not grounded, and the main pole layer 141 and the auxiliary pole layer 142 are grounded to form a ground conductor of CPW. According to such configuration of CPW, when a microwave current is supplied, electrical flux lines 144 are applied to the ground conductor 141 that is arranged at top and bottom sides in the laminated direction of the line conductor 140 but no electrical flux line is directly applied to the magnetic recording medium. Thus, magnetic field 145 produced to flow perpendicular to the electrical flux lines 144 also reduces itself. In other words, the resonance magnetic field 145 in a longitudinal direction (track direction in the magnetic recording medium surface or substantially in the magnetic recording medium surface) that is perpendicular to the direction of the electrical flux lines 144 toward the surface of the magnetic recording medium 143 becomes weak. This resonance magnetic field 145 is a high-frequency magnetic field in a microwave band at or around a ferromagnetic resonance frequency $F_R$ of a magnetic recording layer of the magnetic recording medium 143. However, since the resonance magnetic field 145 is directed to the longitudinal direction or the track direction, even if this magnetic field 145 is applied to the magnetic recording layer during the write operation, it is impossible to reduce a coercive force of the magnetic recording layer so as to decrease the write magnetic field intensity, which is necessary for writing, in a direction that is perpendicular to or substantially perpendicular to the magnetic recording medium surface.

Also, in FIG. 14b, reference numeral 150 denotes a line conductor of I-MLIN, 151 and 152 denote a main pole layer and an auxiliary pole layer of a magnetic write head element arranged at top and bottom side (both sides in FIG. 14b) in a laminated direction of the line conductor 150, and 153 denotes a magnetic recording medium, respectively.

In this case, the magnetic recording medium 153 is grounded, and is utilized as a ground conductor of I-MLIN. According to such configuration of I-MLIN, since it is designed that the ground conductor or the magnetic recording medium 153 located below the line conductor 150 becomes the return of the electrical flux lines when a microwave current is supplied, most of the electrical flux lines 154 are directly applied to the magnetic recording medium 153, and also the magnetic field 155 is concentrated toward a lower position at which the magnetic recording medium 153 exists without laterally spreading. It should be noted however that this operation will occur only when a distance between the line conductor 150 and each of the main pole layer 151 and the auxiliary pole layer 152 arranged at top and bottom sides in the laminated direction of the line conductor 150 is larger than a distance between the line conductor 150 and the magnetic recording medium 153 that is the grand conductor.

To maximize the power emitted from the line conductor 150 in the I-MLIN, it is necessary to collect the electrical flux lines from the line conductor 150 and to emit them to the magnetic recording medium 153. However, the shape and the size of the line conductor 150, which can concentrate the electrical flux lines from the line conductor 150 to the magnetic recording medium 153, have never been brought under review.

SUMMARY OF THE INVENTION

It is therefore an object of the present invention to provide a thin-film magnetic head having microwave magnetic exciting function and a magnetic recording and reproducing apparatus with this thin-film magnetic head, whereby a magnetic field for microwave resonance can be efficiently and intensively applied to a magnetic recording medium.

According to the present invention, a thin-film magnetic head having microwave magnetic exciting function includes a write magnetic field production unit for producing, in response to a write signal, a write magnetic field to be applied into a magnetic recording medium, a line conductor of a microwave radiator of a plane-structure type, formed independent from the write magnetic field production unit, for radiating, by feeding there through a microwave excitation current, a microwave band resonance magnetic field with a frequency equal to or in a range near a ferromagnetic resonance frequency $F_R$ of the magnetic recording medium, and two conductors separated from the line conductor in a direction perpendicular to a track-width direction of the thin-film magnetic head and parallel to an ABS of the thin-film magnetic head. The microwave radiator is an inverted micro strip waveguide having the line conductor and a ground conductor constituted by the magnetic recording medium. A section of the line conductor, perpendicular to the track-width direction has a rectangular shape. An aspect ratio B/A is within a region from 0.15 to 1.2 or within a region of 7 or more, where A is a length in a lateral direction of the line conductor, which is in parallel with the ABS and perpendicular to the track-width direction, and B is a length in a longitudinal direction of the line conductor, which is perpendicular to the air bearing surface.

Since the aspect ratio B/A of the line conductor is set within a region from 0.15 to 1.2 or a region of 7 or more, an appropriate flatness degree of the line conductor can obtained resulting that a microwave can be very efficiently and intensively applied to the magnetic recording medium.

Strong magnetic field is intensively emitted from two corners of the line conductor having a rectangular shape, which are opposed to the ground conductor. However, there is no proportional relationship between a distance between these two corners and an intensity of the magnetic field applied to the magnetic recording medium. In case that the distance between the two corners is long, since the magnetic fields emitted from these corners are not synthesized with each other, the intensity of the magnetic field applied to the magnetic recording medium decreases in response to increase in the distance between the corners. Therefore, when the line conductor has a flat shape, the greater in the flatness degree namely the smaller in the aspect ratio B/A, the smaller in the magnetic field applied to the magnetic recording medium. In case that the distance between the two corners is short, when the distance between the corners is less than a certain value, since it is equivalent to exist only one corner, the intensity of the magnetic field applied to the magnetic recording medium is kept constant irrespective of the distance. Therefore, when the line conductor has a vertically long shape, the magnetic field applied to the magnetic recording medium is kept constant if the aspect ratio B/A becomes larger than a certain constant value. In case that the distance between the two corners is a middle value, because the magnetic field is synthesized or canceled to each other depending upon the distance, the magnetic field intensity changes depending upon the distance. Thus, when the aspect ratio B/A of the line conductor is set within a region from 0.15 to 1.2 or a region of 7 or more, a relatively strong intensity in the magnetic field can be obtained. If the aspect ratio B/A of the line conductor is set as 7 or more, an area of the line conductor becomes large and therefore an amount of current fed through the line conductor increases.

Of course, according to the present invention, a data signal can be precisely written onto the magnetic recording medium with a large coercivity without performing thermal assisting or heating.

Also, according to the present invention, because the microwave radiator has a micro strip line, electrical force lines from the line conductor directly return to the magnetic recording medium, which is a ground conductor, resulting that substantially all the microwave power converted into the electrical field/magnetic field can be applied to the magnetic recording medium. Furthermore, because of the inverted micro strip line structure, the electrical force lines are applied to the magnetic recording medium, which is the ground conductor, without advancing in the backside direction of the substrate. Also, since there exists only air between the line conductor and the magnetic recording medium, which is a ground conductor, a dielectric loss becomes very small in comparison with that there exists a dielectric material there between.

By applying electrical flux lines toward the surface of the magnetic recording medium, a resonance magnetic field in a longitudinal direction (a track direction in-plane or substantially in-plane of the surface of the magnetic recording medium) that is a perpendicular direction to the electrical flux lines is produced. This resonance magnetic field is a high frequency magnetic field in a microwave frequency band with a frequency equal to or in a range near a ferromagnetic resonance frequency $F_R$ of the magnetic recording layer of the magnetic recording medium. Because such resonance magnetic field along the track direction is applied to the magnetic recording layer when writing, magnetization of the medium becomes unstable and thus an intensity of a write magnetic field in a perpendicular direction, that is a direction perpendicular to or substantially perpendicular to the layer surface of the magnetic recording layer, necessary for writing can be extremely reduced.

Meaning of terms used in this specification will be defined as follows. In a multi-layered structure of a thin-film magnetic head formed on a element-formed surface or a surface on which elements are formed, of a substrate, a layer located nearer to the substrate than a reference layer is called as a "lower" layer of the reference layer and a section of a layer, which section is located nearer to the substrate than other section of the layer is called as a "lower" section of the layer. Also, a layer located farther from the substrate than a reference layer or located at the opposite side from the substrate with respect to a reference layer is called as an "upper" layer of the reference layer and a section of a layer, which section is located farther from the substrate than other section of the layer is called as an "upper" section of the layer. For example, "a lower pole layer is laminated on an insulation layer" means as "a lower pole layer is laminated on an insulation layer so that it locates farther from the substrate than the insulation layer".

It is preferred that the thin-film magnetic head further includes a write head element with a perpendicular magnetic recording structure having a main pole, an auxiliary pole and a coil unit wound to pass through between the main pole and the auxiliary pole, that the write magnetic field production unit includes the coil unit, that the at least line conductor of the microwave radiator is arranged between the main pole and the auxiliary pole, and that two conductors include the main pole and the auxiliary pole. In the write head element with a perpendicular magnetic recording structure, because the strongest write magnetic field is produced at the end edge of the tope end section of the main pole near the auxiliary pole, if the line conductor is arranged between the main pole and the auxiliary pole, the microwave band resonance magnetic field can be more effectively applied to the magnetic recording medium.

It is also preferred that the thin-film magnetic head further includes a write head element with a perpendicular magnetic recording structure having a main pole, an auxiliary pole and a coil unit wound to pass through between the main pole and the auxiliary pole, that the write magnetic field production unit includes the coil unit, that the at least line conductor of the microwave radiator is arranged on the other side of the main pole with respect to the auxiliary pole, that one of the two conductors includes the auxiliary pole.

According to the present invention, also, a magnetic recording and reproducing apparatus with a thin-film magnetic head having microwave magnetic exciting function, includes a magnetic recording medium having a magnetic recording layer, a thin-film magnetic head having a write magnetic field production unit for producing, in response to a write signal, a write magnetic field to be applied into the magnetic recording layer of the magnetic recording medium, a line conductor of a microwave radiator of a plane-structure type, formed independent from the write magnetic field production unit, for radiating, by feeding there through a microwave excitation current, a microwave band resonance magnetic field with a frequency equal to or in a range near a ferromagnetic resonance frequency $F_R$ of the magnetic recording layer of the magnetic recording medium, and two conductors separated from the line conductor in a direction perpendicular to a track-width direction of the thin-film magnetic head and parallel to an ABS of the thin-film magnetic head, the microwave radiator being an inverted micro strip waveguide having the line conductor and a ground conductor constituted by the magnetic recording medium, a section of the line conductor, perpendicular to the track-width direction, having a rectangular shape, an aspect ratio B/A being within a region from 0.15 to 1.2 or within a region of 7 or more, where A is a length in a lateral direction of the line conductor, which is in parallel with the air bearing surface and perpendicular to the track-width direction, and B is a length in a longitudinal direction of the line conductor, which is perpendicular to the ABS, a write signal supply unit for supplying the write signal to the write magnetic field production unit, and a microwave excitation current supply unit for supplying the microwave excitation current to the microwave radiator.

Since the aspect ratio B/A of the line conductor is set within a region from 0.15 to 1.2 or a region of 7 or more, an appropriate flatness degree of the line conductor can obtained resulting that a microwave can be very efficiently and intensively applied to the magnetic recording medium.

Strong magnetic field is intensively emitted from two corners of the line conductor having a rectangular shape, which are opposed to the ground conductor. However, there is no proportional relationship between a distance between these two corners and an intensity of the magnetic field applied to the magnetic recording medium. In case that the distance between the two corners is long, since the magnetic fields emitted from these corners are not synthesized with each other, the intensity of the magnetic field applied to the magnetic recording medium decreases in response to increase in the distance between the corners. Therefore, when the line conductor has a flat shape, the greater in the flatness degree namely the smaller in the aspect ratio B/A, the smaller in the magnetic field applied to the magnetic recording medium. In case that the distance between the two corners is short, when the distance between the corners is less than a certain value, since it is equivalent to exist only one corner, the intensity of the magnetic field applied to the magnetic recording medium is kept constant irrespective of the distance. Therefore, when the line conductor has a vertically long shape, the magnetic field applied to the magnetic recording medium is kept constant if the aspect ratio B/A becomes larger than a certain constant value. In case that the distance between the two corners is a middle value, because the magnetic field is synthesized or canceled to each other depending upon the distance, the magnetic field intensity changes depending upon the distance. Thus, when the aspect ratio B/A of the line conductor is set within a region from 0.15 to 1.2 or a region of 7 or more, a relatively strong intensity in the magnetic field can be obtained. If the aspect ratio B/A of the line conductor is set as 7 or more, an area of the line conductor becomes large and therefore an amount of current fed through the line conductor increases.

Of course, according to the present invention, a data signal can be precisely written onto the magnetic recording medium with a large coercivity without performing thermal assisting or heating.

Also, according to the present invention, because the microwave radiator has a micro strip line, electrical force lines from the line conductor directly return to the magnetic recording medium, which is a ground conductor, resulting that substantially all the microwave power converted into the electrical field/magnetic field can be applied to the magnetic recording medium. Furthermore, because of the inverted micro strip line structure, the electrical force lines are applied to the magnetic recording medium, which is the ground conductor, without advancing in the backside direction of the substrate. Also, since there exists only air between the line conductor and the magnetic recording medium, which is a ground conductor, a dielectric loss becomes very small in comparison with that there exists a dielectric material there between.

By applying electrical flux lines toward the surface of the magnetic recording medium, a resonance magnetic field in a longitudinal direction (a track direction in-plane or substantially in-plane of the surface of the magnetic recording medium) that is a perpendicular direction to the electrical flux lines is produced. This resonance magnetic field is a high frequency magnetic field in a microwave frequency band with a frequency equal to or in a range near a ferromagnetic resonance frequency $F_R$ of the magnetic recording layer of the magnetic recording medium. Because such resonance magnetic field along the track direction is applied to the magnetic recording layer when writing, magnetization of the medium becomes unstable and thus an intensity of a write magnetic field in a perpendicular direction, that is a direction perpendicular to or substantially perpendicular to the layer surface of the magnetic recording layer, necessary for writing can be extremely reduced.

It is preferred that the thin-film magnetic head further includes a write head element with a perpendicular magnetic recording structure having a main pole, an auxiliary pole and a coil unit wound to pass through between the main pole and the auxiliary pole, that the write magnetic field production unit includes the coil unit, that the at least line conductor of the microwave radiator is arranged between the main pole and the auxiliary pole, and that two conductors include the main pole and the auxiliary pole. In the write head element with a perpendicular magnetic recording structure, because the strongest write magnetic field is produced at the end edge of the tope end section of the main pole near the auxiliary pole, if the line conductor is arranged between the main pole and the auxiliary pole, the microwave band resonance magnetic field can be more effectively applied to the magnetic recording medium.

It is also preferred that the thin-film magnetic head further includes a write head element with a perpendicular magnetic recording structure having a main pole, an auxiliary pole and a coil unit wound to pass through between the main pole and the auxiliary pole, that the write magnetic field production unit includes the coil unit, that the at least line conductor of the microwave radiator is arranged on the other side of the main pole with respect to the auxiliary pole, that one of the two conductors includes the auxiliary pole.

It is further preferred that one output terminal of the microwave excitation current supply unit is connected to the line conductor of the microwave radiator, and that the other output terminal of the microwave excitation current supply unit is connected to the ground conductor constituted by the magnetic recording medium through a resistor.

It is still further preferred that one end of the line conductor of the microwave radiator is grounded or terminated by a resistor element having an impedance equivalent to the characteristic impedance of the microwave radiator, and that the other end of the line conductor is connected to the microwave excitation current supply unit.

It is further preferred that the apparatus further comprises a DC excitation current supply unit for supplying a DC excitation current to the microwave radiator.

It is further preferred that the write magnetic field is applied to the magnetic recording layer of the magnetic recording medium in a direction perpendicular or substantially perpendicular to a layer plane of the magnetic recording layer, and that the resonance magnetic field runs through the magnetic recording layer in a direction parallel or substantially parallel to the layer plane of the magnetic recording layer.

Further objects and advantages of the present invention will be apparent from the following description of the preferred embodiments of the invention as illustrated in the accompanying drawings.

BRIEF DESCRIPTION OF THE DRAWINGS

FIGS. 14a and 14b, as already described, show sectional views illustrating configurations of CPW and I-MLIN as a microwave magnetic field emission means in a conventional microwave-assisted magnetic recording system, respectively.

DESCRIPTION OF THE PREFERRED EMBODIMENTS

Figure 1:
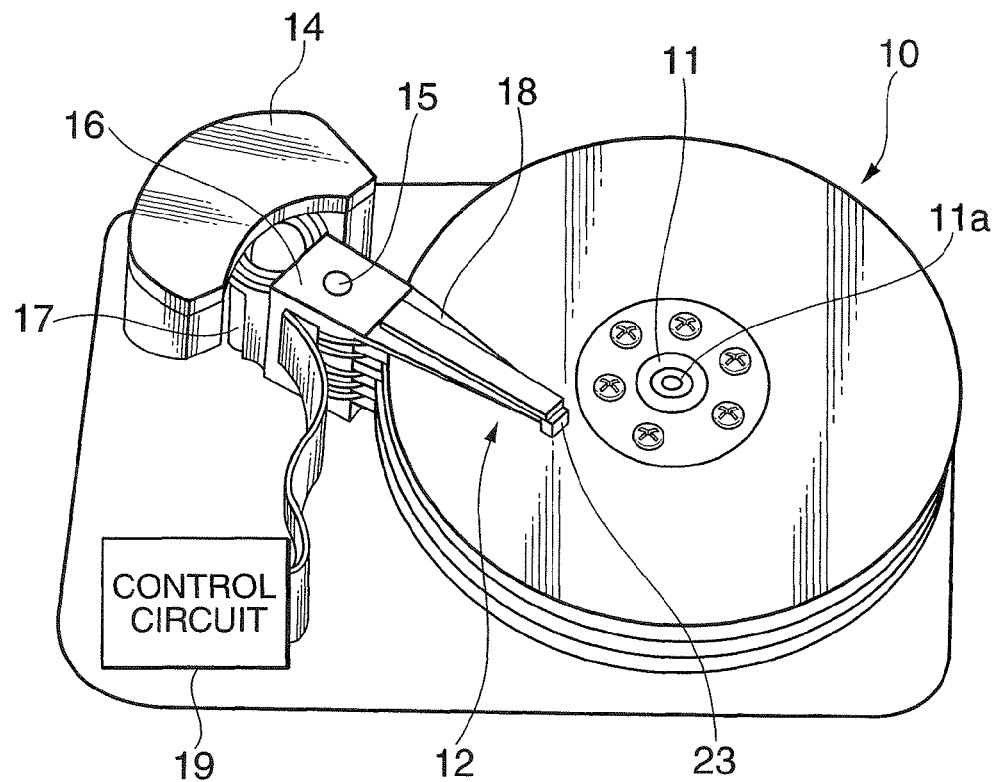
FIG. 1 is a perspective view schematically illustrating a main part structure of an embodiment of a magnetic recording and reproducing apparatus according to the present invention.

Hereinafter, an embodiment according to the present invention will be described with reference to these appended drawings. In these drawings, the similar elements are indicated by using the same reference symbols, respectively. Also, in the drawings, dimensions in each element and between the elements are optional for easy understanding of the configuration.

Figure 2:
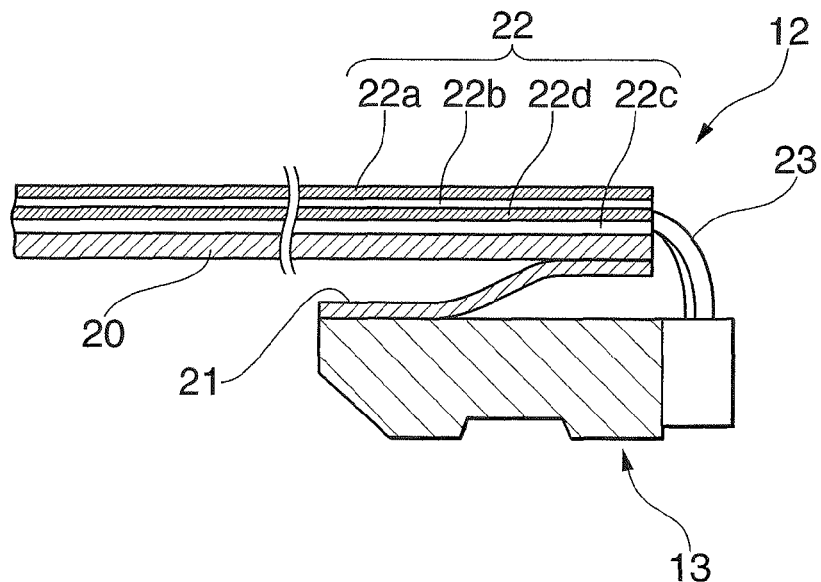
FIG. 2 is a sectional view schematically illustrating a part of a head gimbal assembly (HGA) in the magnetic recording and reproducing apparatus shown in FIG. 1.

FIG. 1 schematically illustrates a main part structure of an embodiment of a magnetic recording and reproducing apparatus according to the present invention, and FIG. 2 schematically illustrates a part of an HGA in the magnetic recording and reproducing apparatus shown in FIG. 1.

In FIG. 1, which represents a magnetic disk drive apparatus as the embodiment of the magnetic recording and reproducing apparatus, reference numeral 10 denotes a plurality of magnetic disks capable of rotating about a rotary axis 11a of a spindle motor 11, 12 denotes the HGA for appropriately facing a thin-film magnetic head or a magnetic head slider 13 to a surface of each magnetic disk 10 so as to write and read a data signal to and from the magnetic disk 10, and 14 denotes an assembly carriage device for positioning the thin-film magnetic head or magnetic head slider on a track on the magnetic disk 10, respectively.

The assembly carriage device 14 mainly has a carriage 16 swingable about a pivot-bearing axis 15 and a voice coil motor (VCM) 17 for driving the carriage 16 to swing. Base end sections of a plurality of drive arms 18 stacked in a direction along the pivot-bearing axis 15 are attached to the carriage 16 and the HGA 12 is fixed to the top end section of each drive arm 18. In modifications, the magnetic disk drive apparatus may include only a single magnetic disk 10, a single drive arm 18 and a single HGA 12.

Figure 13:
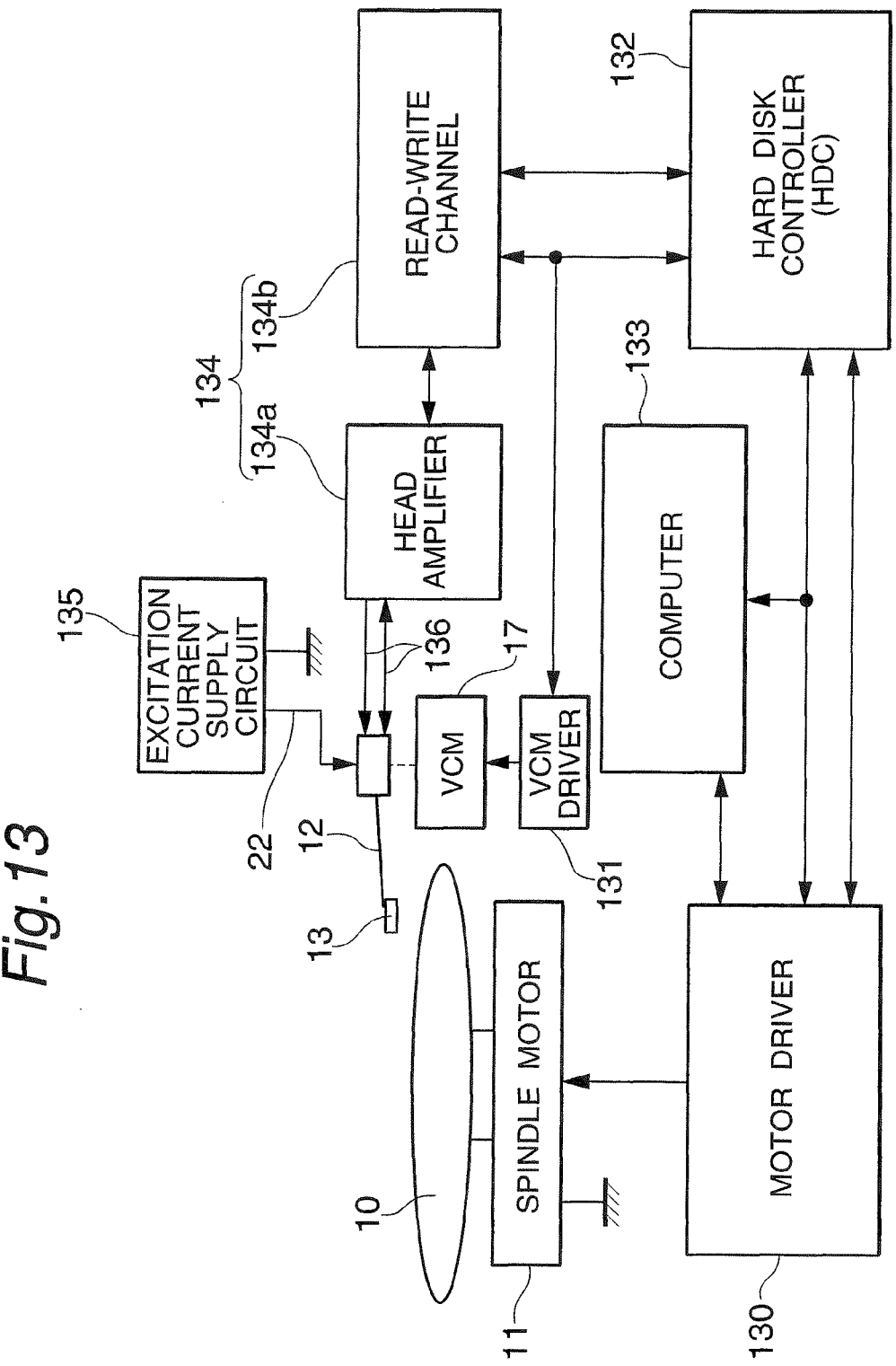
FIG. 13 is a block diagram schematically illustrating an electrical configuration of the magnetic disk drive apparatus in the embodiment of FIG. 1.

The magnetic disks 10 are grounded through the spindle motor 11 and its rotary axis 11a (see FIG. 13).

In FIG. 1, furthermore, reference numeral 19 denotes a read, write and resonance control circuit for controlling write and read operations of the thin-film magnetic head 13 and for controlling a microwave excitation current for ferromagnetic resonance.

As shown in FIG. 2, the HGA 12 has the thin-film magnetic head 13, a load beam 20 and a flexure 21 both made of a metal conductive material for supporting the thin-film magnetic head 13, and an excitation current wiring member 22 that is a transmission line for feeding a microwave excitation current and a DC excitation current there through. Although it is not shown, the HGA 12 also has a head element wiring member that is a transmission line for feeding a write signal applied to a write head element of the thin-film magnetic head 13 and for feeding a constant current to a read head element to pull out a read output voltage there from.

The thin-film magnetic head 13 is attached to one end section of the resilient flexure 21. The other end section of the flexure 21 is attached to the load beam 20. The flexure 21 and the load beam 20 constitute a suspension for supporting the thin-film magnetic head 13.

The most part along the whole length of the excitation current wiring member 22 is configured by a strip line having upper and lower ground conductors or planes. As shown in FIG. 2, the strip line is composed of the load beam 20 that constitutes the lower ground plane, the upper ground plane 22a, a line conductor 22d made of for example copper (Cu) sandwiched between the upper and lower ground planes 22a and 20, and dielectric layers 22b and 22c made of a dielectric material such as for example polyimide for supporting the line conductor 22d between the upper and lower ground planes 22a and 20. The excitation current wiring member 22 has a strip line arranged in parallel to the load beam surface in case that the microwave circuit has an unbalanced structure. A magnetic head side end of the strip line is in this embodiment connected to a terminal electrode by wire-bonding using a wire 23. Although it is not shown, the write head element wiring member and the read head element wiring member are configured by normal lead conductors and magnetic head side ends of the lead conductors are in this embodiment connected to terminal electrodes of the write head element and the read head element also by wire-bonding. In modifications, these wiring members may be connected with the terminal electrodes by ball bonding not by wire bonding.

Figure 3:
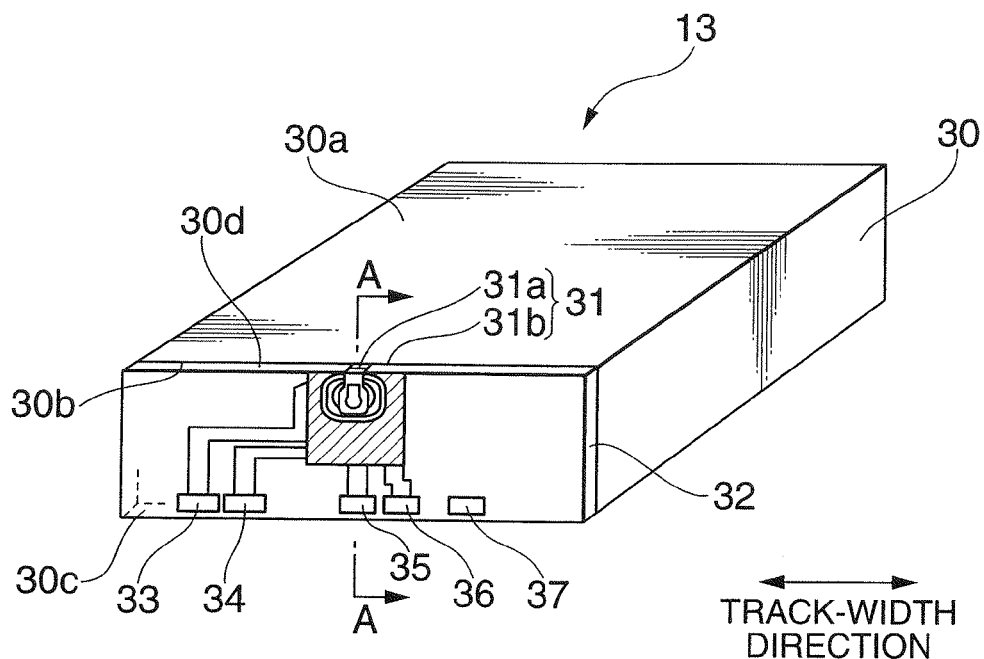
FIG. 3 is a perspective view schematically illustrating the whole of a thin-film magnetic head in the embodiment of FIG. 1.

FIG. 3 schematically illustrates the whole of the thin-film magnetic head 13 in this embodiment.

As shown in the figure, the thin-film magnetic head 13 has a slider substrate 30 with an ABS 30a machined to obtain an appropriate flaying height, a magnetic head element 31 formed on an element formed surface 30b that is one side surface when the ABS 30a is defined as the bottom surface and perpendicular to this ABS 30a, a protection layer 32 formed on the element formed surface 30b for covering the magnetic head element 31, and five terminal electrodes 33, 34, 35, 36 and 37 exposed from a surface of the protection layer 32.

The magnetic head element 31 is mainly constituted from a magnetoresistive effect (MR) read head element 31a for reading a data signal from the magnetic disk, and an inductive write head element 31b for writing the data signal onto the magnetic disk. The terminal electrodes 33 and 34 are electrically connected to the MR read head element 31a, the terminal electrodes 35 and 36 are electrically connected to the inductive write head element 31b, and the terminal electrode 37 is electrically connected to one end of a line conductor 38 (FIG. 4) of an inverted micro strip waveguide (I-MLIN) described later. The other end of the line conductor 38 is grounded in case of an unbalanced structure. The positions of these terminal electrodes 33, 34, 35, 36 and 37 are not limited to those shown in FIG. 3. Namely, these terminal electrodes 33, 34, 35, 36 and 37 can be set at any positions on the element formed surface 30b and with any arrangement. Further, these terminal electrodes 33, 34, 35, 36 and 37 may be formed on a slider-end face 30c facing opposite direction as the ABS 30a. In case that the thin-film magnetic head has a heater for adjusting its flying height, a terminal electrode electrically connected to the heater will be formed.

One ends of the MR read head element 31a and the inductive write head element 31b come at a slider-end face 30d facing the same direction as the ABS 30a. This slider-end face 30d is mainly configured by a surface of the protection layer 32 facing to the same direction as the ABS 30a but excluded the ABS 30a of the slider substrate 30 itself. Namely, the slider-end face 30d is a part of the medium facing surface of the thin-film magnetic head 13 other than the ABS 30a. By facing the one ends of the MR read head element 31a and the inductive write head element 31b to the magnetic disk, reading of data signal owing to receiving of signal magnetic field and writing of data signal owing to application of signal magnetic field are performed. The one end or near the ones end of each element come to the slider-end face 30d may be covered for protection by an extremely thin coating film of diamond like carbon (DLC) for example.

Figure 4:
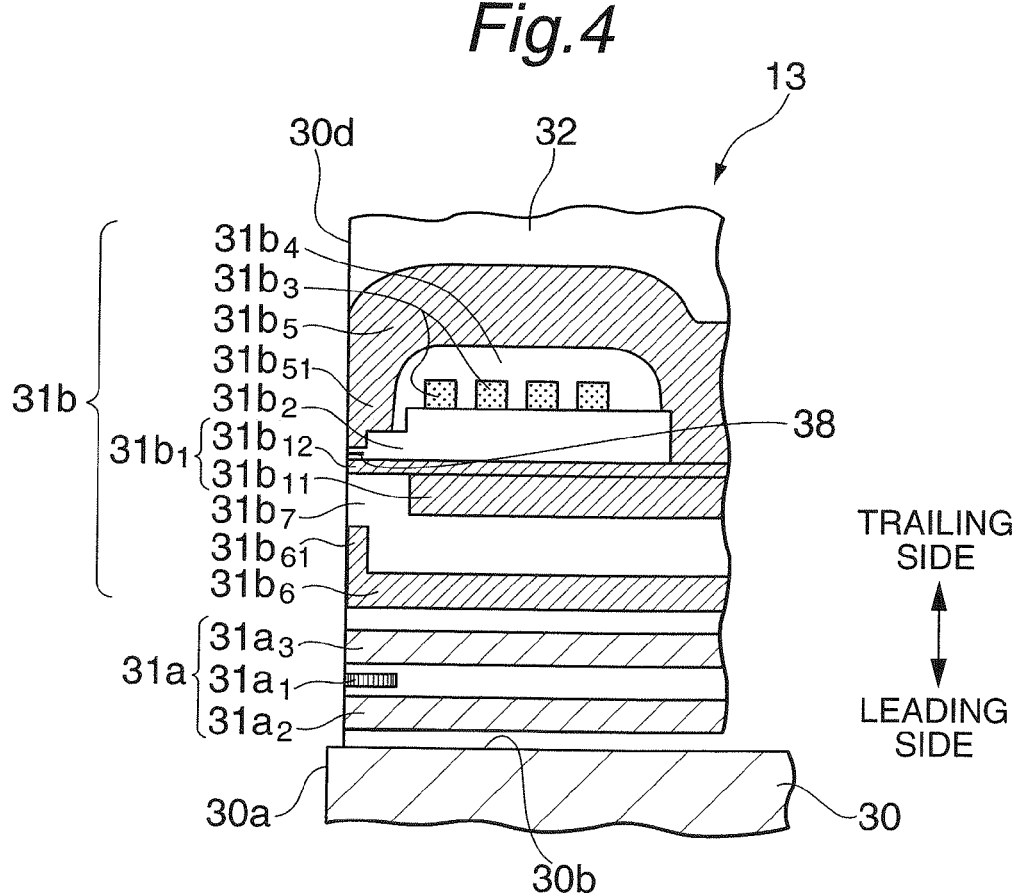
FIG. 4 is an A-A sectional view of FIG. 3 schematically illustrating the whole of the thin-film magnetic head in the embodiment of FIG. 1.
Figure 5:
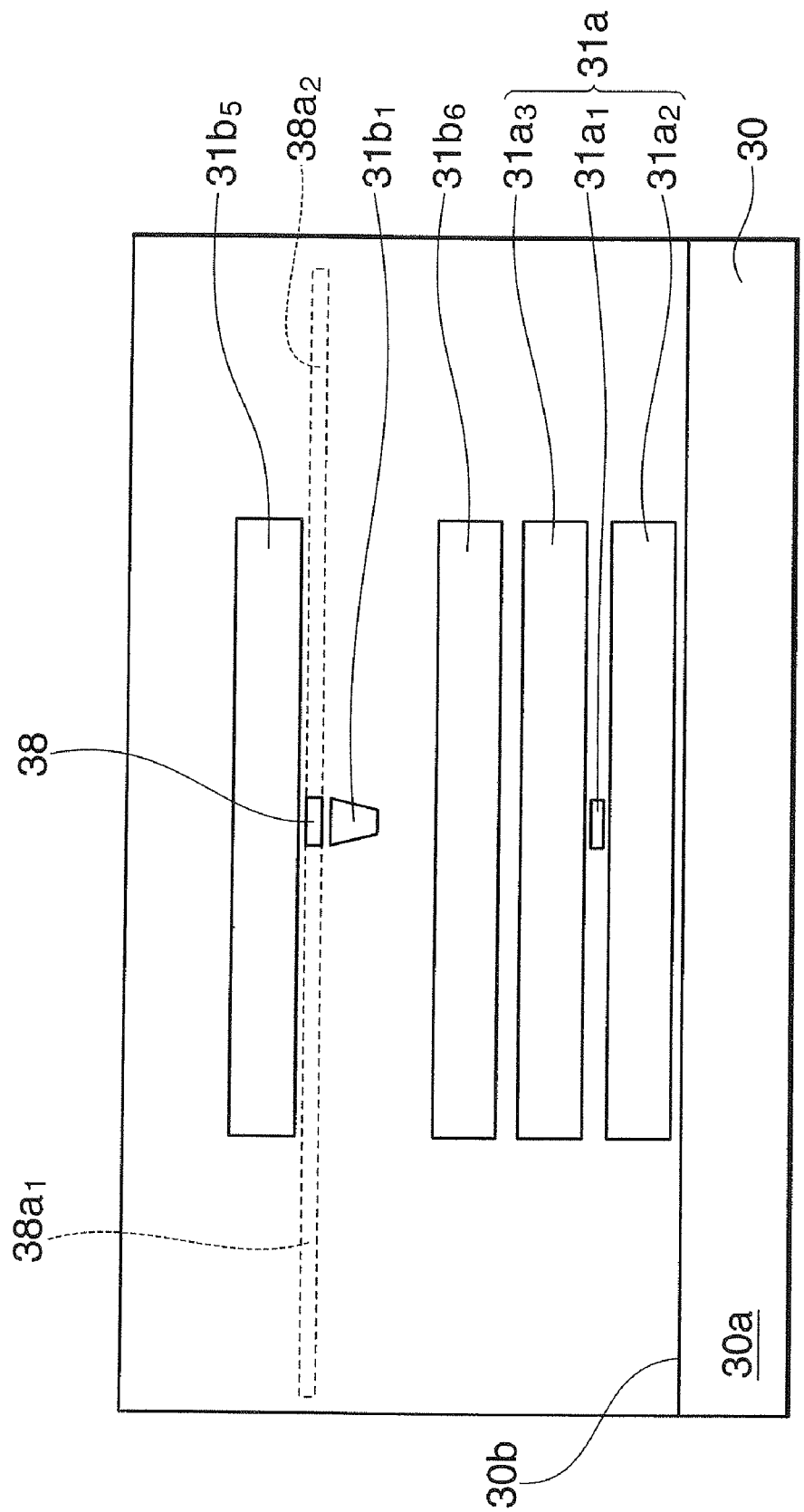
FIG. 5 is a sectional view schematically illustrating the structure, seen from the ABS side, of the thin-film magnetic head in the embodiment of FIG. 1.
Figure 6:
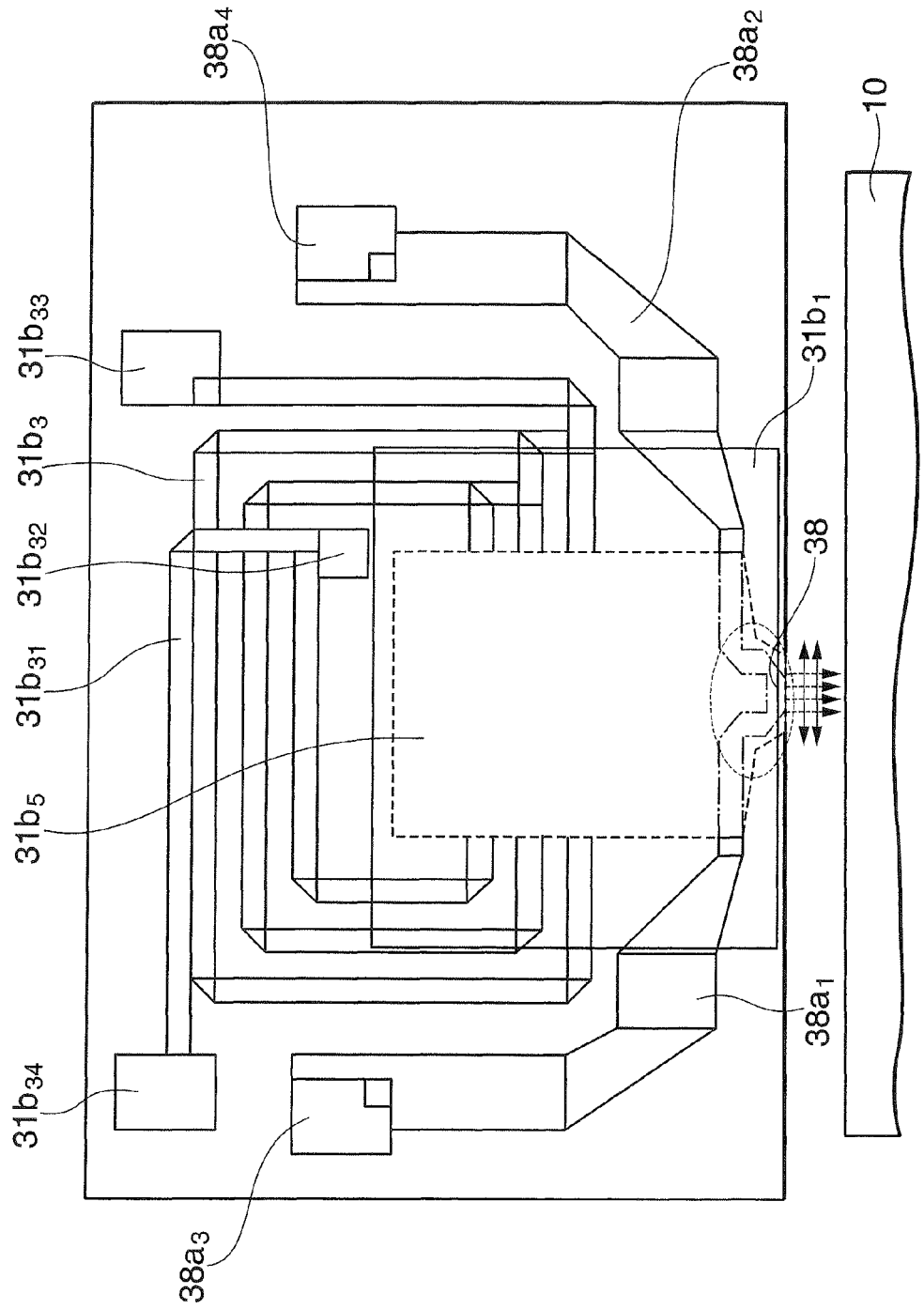
FIG. 6 is a sectional view schematically illustrating a part of the structure, seen from the upper side with respect to a substrate, of the thin-film magnetic head in the embodiment of FIG. 1.

FIG. 4, which is an A-A sectional view of FIG. 3, schematically illustrates the whole of the thin-film magnetic head 13 in this embodiment, FIG. 5 schematically illustrates the structure, seen from the ABS side, of the thin-film magnetic head 13 in this embodiment, and FIG. 6 schematically illustrates a part of the structure, seen from the upper side with respect to a substrate, of the thin-film magnetic head 13 in this embodiment.

In FIGS. 4 and 5, reference numeral 30 denotes the slider substrate made of Al—TiC ($Al_2O_3$—TiC) for example and provided with the ABS 30a facing to in operation the surface of the magnetic disk. On the element formed surface 30b of the slider substrate 30, the MR read head element 31a, the inductive write head element 31b, the line conductor 38 of the I-MLIN described later and the protection layer 32 for protecting these elements are mainly formed.

The MR read head element 31a has an MR multilayer $31a_1$, and a lower shield layer $31a_2$ and an upper shield layer $31a_3$ formed to sandwich the MR multilayer $31a_1$. The MR multilayer $31a_1$ consists of a current in plane (CIP) type GMR multilayer, a current perpendicular to plane (CPP) type GMR multilayer or a TMR multilayer, to receive signal magnetic field from the magnetic disk with extremely high sensitivity. The lower shield layer $31a_2$ and the upper shield layer $31a_3$ prevent the MR multilayer $31a_1$ from being affected by external magnetic field or noise.

In case that the MR multilayer $31a_1$ is a CIP-GMR multilayer, a lower shield gap layer for insulation is formed between the lower shield layer $31a_2$ and the MR multilayer $31a_1$, and an upper shield gap layer for insulation is formed between the MR multilayer $31a_1$ and the upper shield layer $31a_3$. Further, MR lead conductive layers for feeding a sense current to and extracting a reproduction output from the MR multilayer $31a_1$ are formed. In case that the MR multilayer $31a_1$ is a CPP-GMR multilayer or the TMR multilayer, the lower shield layer $31a_2$ and the upper shield layer $31a_3$ also operate as a lower electrode layer and an upper electrode layer, respectively. No lower shield gap layer, no upper shield gap layer and no MR lead conductive layer are necessary. Although it is not shown in the figure, insulation layers or bias insulation layers and hard bias layers for applying a longitudinal bias magnetic field to provide stability in the magnetic domain are formed on both sides in the track-width direction of the MR multilayer $31a_1$.

The MR multilayer $31a_1$, in case of the TMR multilayer, has for example a multi-layered structure of sequentially stacking an anti-ferromagnetic layer, a pinned layer, a tunnel barrier layer and a free layer. The anti-ferromagnetic layer is made of for example iridium manganese (IrMn), platinum manganese (PtMn), nickel manganese (NiMn) or ruthenium rhodium manganese (RuRhMn) and has a thickness of about 5-15 nm. The pinned layer whose magnetization direction is fixed by the anti-ferromagnetic layer has three-layered films of two ferromagnetic films made of cobalt iron (CoFe) for example and a nonmagnetic metal film made of ruthenium (Ru) for example sandwiched by the two ferromagnetic films. The tunnel barrier layer consists of an oxidized nonmagnetic dielectric layer formed by oxidizing using oxygen introduced into a vacuum chamber or naturally oxidizing a metal film made of aluminum (Al), aluminum copper (AlCu) or magnesium (Mg) for example with a thickness of about 0.5-1 nm. The free layer has two-layered films of a ferromagnetic film made of CoFe for example with a thickness of about 1 nm and a ferromagnetic film made of nickel iron or permalloy (NiFe) for example with a thickness of about 3-4 nm and is tunneling-exchange coupled with the pinned layer through the tunnel barrier layer.

Each of the lower shield layer $31a_2$ and the upper shield layer $31a_3$ is formed using a pattern-plating method such as a frame-plating method from NiFe, cobalt iron nickel (CoFeNi), CoFe, iron nitride (FeN) or iron zirconium nitride (FeZrN) for example with a thickness of about 0.3-3 µm.

The inductive write head element 31b is a perpendicular magnetic recording type and has a main pole layer $31b_1$ as a main pole for generating a write magnetic field from the end section at its ABS 30a side or slider end face 30d side when writing data signals, a trailing gap layer $31b_2$, a write coil $31b_3$ having a spiral shape and being formed to pass between the main pole layer and an auxiliary pole layer while its at least one turn, a write coil insulation layer $31b_4$, the auxiliary pole layer $31b_5$ as an auxiliary pole that is magnetically connected to the main pole layer $31b_1$ at a portion discrete from its end edge at the side of the ABS 30a or the slider-end face 30d, an auxiliary shield layer $31b_6$ as an auxiliary shield, and a leading gap layer $31b_7$.

The main pole layer $31b_1$ consists of a main pole yoke layer $31b_{11}$ and a main pole major layer $31b_{12}$ and constitutes a magnetic conduit for guiding a magnetic flux, which is produced by feeding a write current to the write coil $31b_3$, while making convergence to a magnetic recording layer in the magnetic disk. A thickness of the main pole layer $31b_1$ at its end of the ABS 30a side or the slider-end face 30d side corresponds to the thickness of only the main pole major layer $31b_{12}$ and thus it is thin. Therefore, when writing data signal, it is possible to produce a fine write magnetic field from this end of the main pole layer $31b_1$ to satisfy a high recording density. The main pole yoke layer $31b_{11}$ and the main pole major layer $31b_{12}$ are formed using a sputtering method, or a pattern-plating method such as a frame-plating method from NiFe, CoFeNi, CoFe, FeN or FeZrN for example with a thickness of about 0.5-3.5 µm and a thickness of about 0.1-1 µm, respectively.

The auxiliary pole layer $31b_5$ and the auxiliary shield layer $31b_6$ are arranged at the trailing side and the leading side of the main pole layer $31b_1$, respectively. The auxiliary pole layer $31b_5$ is magnetically connected to the main pole layer $31b_1$ at a portion discrete from its end edge at the side of the ABS 30a or the slider-end face 30d as aforementioned. Whereas the auxiliary shield layer $31b_6$ is not magnetically connected to the main pole layer $31b_1$ in this embodiment.

An end section at the slider-end face 30d side of the auxiliary pole layer $31b_5$ constitutes a trailing shield section $31b_{51}$ with a wider or thicker sectional area than other section of the auxiliary pole layer $31b_5$. This trailing shield section $31b_{51}$ faces the end section at the slider-end face 30d side of the main pole layer $31b_1$ through the trailing gap layer $31b_2$. An end section at the side of the slider-end face 30d of the auxiliary shield layer $31b_6$ constitutes a leading shield section $31b_{61}$ with a wider or thicker sectional area than other section of the auxiliary shield layer $31b_6$. This leading shield section $31b_{61}$ faces the end section at the slider-end face 30d side of the main pole layer $31b_1$ through the leading gap layer $31b_7$. Thanks for such trailing shield section $31b_{51}$ and leading shield section $31b_{61}$, the shunt effect occurs in the magnetic flux and thus a gradient of the write magnetic field between the trailing shield section $31b_{51}$ and the end section of the main pole layer $31b_1$ and between the leading shield section $31b_{61}$ and the end section of the main pole layer $31b_1$ becomes more steep. As a result, jitter in the signal output becomes smaller and an error rate in reading operation can be reduced.

It is possible to appropriately pattern the auxiliary pole layer $31b_5$ or the auxiliary shield layer $31b_6$ so that a part of the auxiliary pole layer $31b_5$ or the auxiliary shield layer $31b_6$ is arranged near the both side in the track-width direction of the main pole layer $31b_1$ to provide so-called side face shields. If such side face shields are formed, shunt effect of the magnetic field will increase.

It is desired that thicknesses or lengths in the layer-thickness direction of the trailing shield section $31b_{51}$ and the leading shield section $31b_{61}$ are determined as about several tens to several hundreds times thicker than that of the main pole layer $32b_1$. A gap length of the trailing gap layer $31b_2$ is preferably about 10-100 nm, more preferably about 20-50 nm. Also, gap length of the leading gap layer $31b_7$ is preferably about 0.1 µm or more.

Each of the auxiliary pole layer $31b_5$ and the auxiliary shield layer $31b_6$ is formed using a pattern-plating method such as a frame-plating method from NiFe, CoFeNi, CoFe, FeN or FeZrN for example with a thickness of about 0.5-4 µm. Each of the trailing gap layer $31b_2$ and the leading gap layer $31b_7$ is formed using a sputtering method or a chemical vapor deposition (CVD) method from alumina ($Al_2O_3$), silicon oxide ($SiO_2$), aluminum nitride (AlN) or DLC for example with a thickness of about 0.1-3 µm.

As shown in FIG. 6, a write current is fed through a lead conductor $31b_{31}$, and via hole conductors $31b_{32}$, $31b_{33}$ and $31b_{34}$ to the write coil $31b_3$. The write insulation layer $31b_4$ envelops the write coil $31b_3$ to electrically insulate the write coil $31b_3$ from surrounding magnetic layers. The write coil $31b_3$ is formed using a frame plating method or a sputtering method from Cu for example with a thickness of about 0.1-5 µm. The lead conductor $31b_{31}$, and via hole conductors $31b_{32}$, $31b_{33}$ and $31b_{34}$ are also formed using a frame plating method or a sputtering method from Cu for example. The write insulation layer $31b_4$ is formed by using a photolithography method and by thermally curing a photoresist for example to have a thickness of about 0.5-7 µm.

As shown in FIGS. 4 to 6, in this embodiment, the line conductor 38 of the inverted micro strip waveguide is formed between the main pole major layer $31b_{12}$ of the main pole layer $31b_1$ and the trailing shield section $31b_{51}$ of the auxiliary pole layer $31b_5$. The length in the track-width direction of the line conductor 38 is substantially the same as that in the track-width direction of the main pole major layer $31b_{12}$ of the main pole layer $31b_1$. A microwave excitation current and a DC excitation current are fed to the line conductor 38 through lead conductors $38a_1$ and $38a_2$ and via hole conductors $38a_3$ and $38a_4$. The line conductor 38, the lead conductors $38a_1$ and $38a_2$, and the via hole conductors $38a_3$ and $38a_4$ are formed using a sputtering method from Cu. One end of the line conductor 38 is grounded through the lead conductor and the via hole conductor, or terminated by a resistor element (not shown) having an impedance equivalent to the characteristic impedance of the I-MLIN. The other end of the line conductor 38 is connected to an excitation current supply circuit 135 (FIG. 13) that will be described later.

Figure 7:
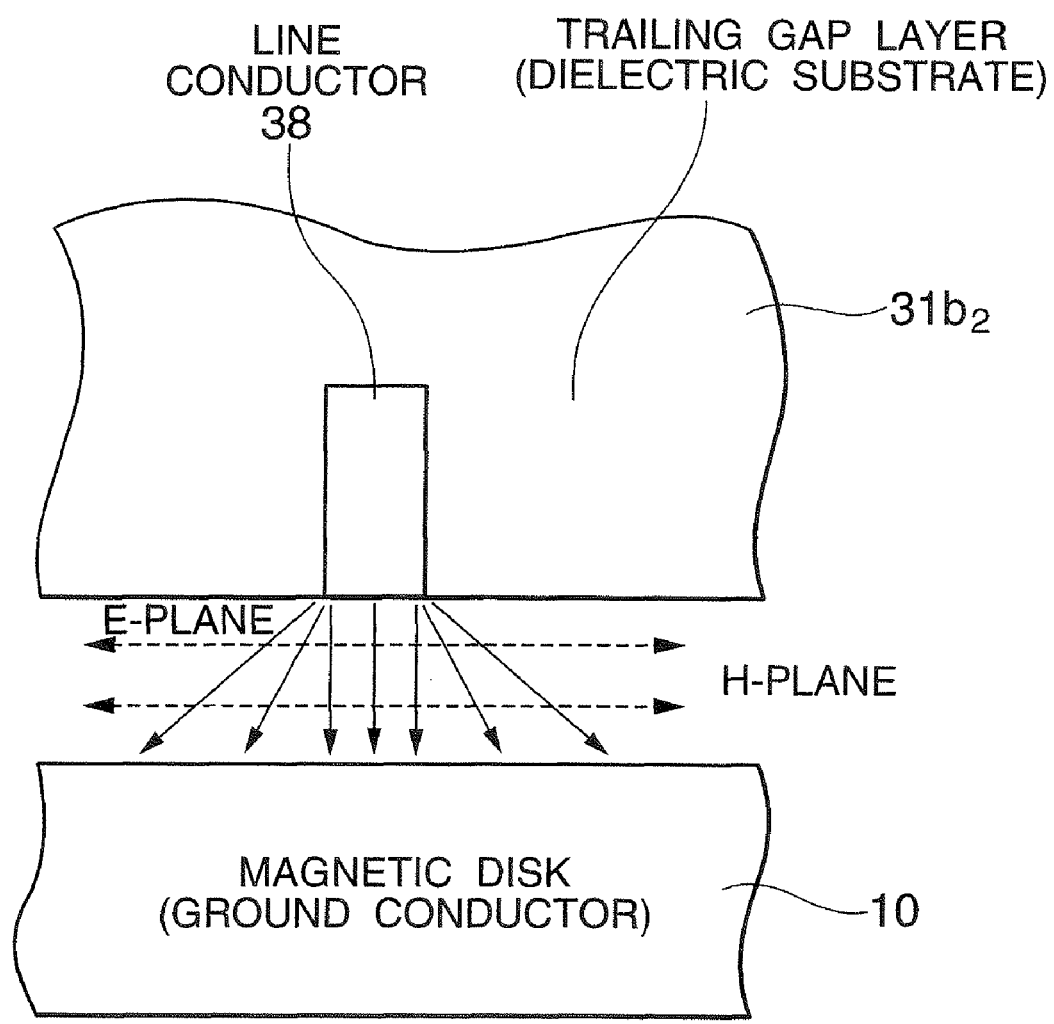
FIG. 7 is a view schematically illustrating a structure of an inverted micro strip waveguide in the embodiment of FIG. 1.

FIG. 7 schematically illustrates the structure of the inverted micro strip waveguide of a plane-structure type in this embodiment.

As shown in the figure, according to this embodiment, the I-MLIN is configured from the line conductor 38 formed between the main pole layer $31b_1$ and the auxiliary pole layer $31b_5$, a ground conductor or ground plane constituted by the magnetic disk 10 facing to this thin-film magnetic head 13. As is well-known in this field, the I-MLIN (inverted micro strip waveguide) is a one modification of the MLIN (micro strip waveguide). Namely, in the MLIN, a line conductor is arranged on one surface of a dielectric substrate and a ground plane is arranged on the other surface of the dielectric substrate. Contrary to this, in the I-MLIN, a line conductor is arranged on one surface of a dielectric substrate and no conductor is arranged on the other surface of the dielectric substrate but a ground conductor is arranged to face with an air gap to the one surface of the dielectric substrate and the line conductor. It should be noted that the magnetic disk 10 is formed from a conductive material and grounded through the spindle motor 11 and its rotary axis 11a, and therefore this magnetic disk 10 functions as a ground conductor. In this case, the trailing gap layer $31b_2$ corresponds to the dielectric substrate. Since a distance between the main pole layer $31b_1$ and the auxiliary pole layer $31b_5$ is for example about 30-40 nm and a gap between the line conductor 38 of the thin-film magnetic head and the surface of the magnetic disk 10 is for example about 3 nm, it is possible, from the view point of microwave, to realize an I-MLIN even if the line conductor 38 is arranged between the main pole layer and the auxiliary pole layer as this embodiment.

By feeding a microwave excitation current through the line conductor 38, electrical flux lines will be produced toward the surface of the magnetic disk 10 between the end section of the main pole layer $31b_1$ and the trailing shield section $31b_{51}$, and thus a resonance magnetic field along a track direction, that is a track direction in-plane or substantially in-plane of the surface of the magnetic disk, between the end section of the main pole layer $31b_1$ and the trailing shield, which direction is a direction perpendicular to that of the electrical flux lines, will be radiated. This resonance magnetic field is a high frequency magnetic field in a microwave frequency band with a frequency equal to or in a range near a ferromagnetic resonance frequency $F_R$ of the magnetic recording layer of the magnetic disk 10. Because such resonance magnetic field along the track direction is applied to the magnetic recording layer when writing, an intensity of a write magnetic field in a perpendicular direction, that is a direction perpendicular to or substantially perpendicular to the layer surface of the magnetic recording layer, necessary for writing can be extremely reduced.

If the resonance magnetic field is produced only due to the microwave current, a large amount of the high frequency current is needed. Thus, in this embodiment, a DC excitation current for radiating a static magnetic field with a intensity of about 80% of the magnetic coercivity of the magnetic disk 10 is superimposed to the microwave excitation current to flow through the line conductor 38. As a result, the microwave power to be applied can be reduced.

Figure 8A:
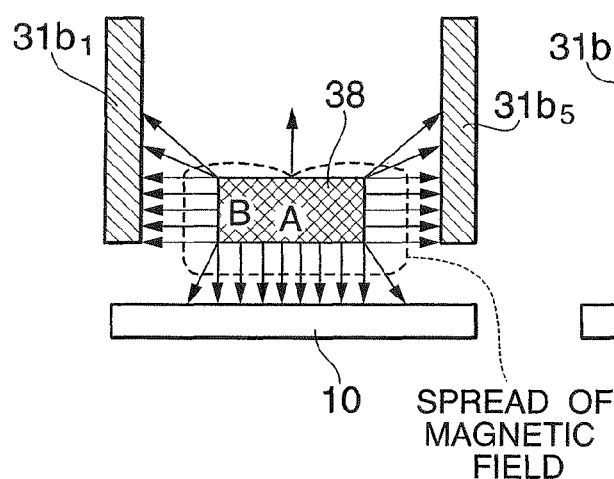
FIGS. 8a and 8b are views illustrating examples in shape of a line conductor of a microwave radiator in the embodiment of FIG. 1.
Figure 8B:
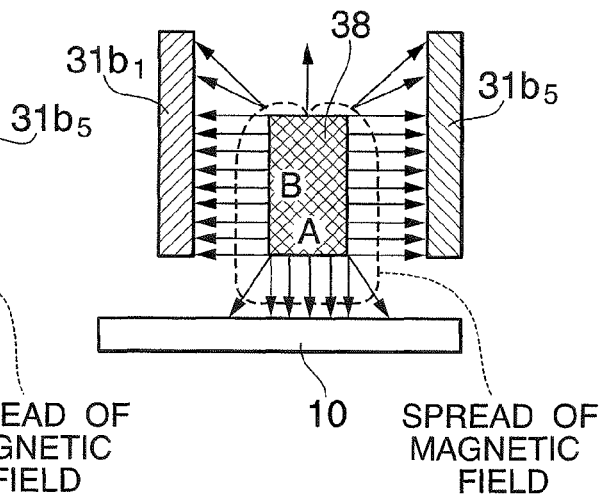

FIGS. 8a and 8b illustrate examples in shape of a line conductor of a microwave radiator in the embodiment of FIG. 1. These figures indicate a section perpendicular to the track-width direction of the thin-film magnetic head.

As will be noted from the figures, the line conductor 38 of the I-MLIN has a rectangular shape in this section perpendicular to the track-width direction. This line conductor 38 is provided with right and left end surfaces respectively opposed parallel to the main pole layer $31b_1$ and the auxiliary pole layer $31b_5$ that are formed in parallel with each other, and a bottom surface opposed parallel to the surface of the magnetic disk 10. Suppose that a length of the line conductor 38 in a lateral direction, which is in parallel with the ABS and perpendicular to the track-width direction is A, and that a length of the line conductor 38 in a longitudinal direction, which is perpendicular to the ABS is B. FIG. 8a indicates a case where an aspect ratio B/A of the line conductor 38 is small and FIG. 8b indicates a case where an aspect ratio B/A of the line conductor 38 is large. As will be noted from these figures, spread or degree of concentration of the emitted magnetic field differs and thus the magnetic field intensity obtained differs, depending upon the aspect ratio B/A of the line conductor 38.

Figure 9:
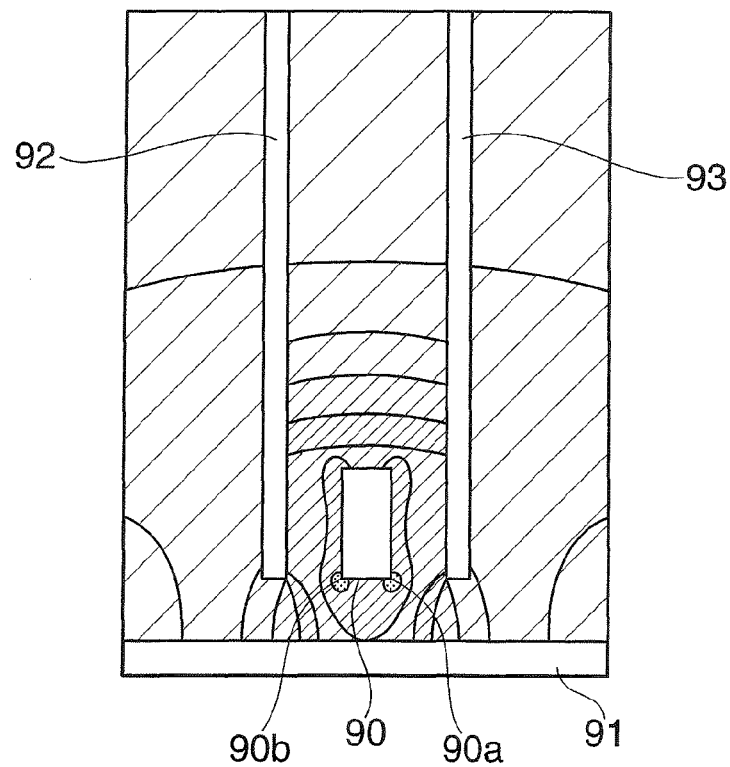
FIG. 9 is a simulated view illustrating an intensity distribution of a magnetic field emitted from the line conductor of the I-MLIN having the similar configuration as that of the embodiment of FIG. 1.

FIG. 9 illustrates in simulation an intensity distribution of a magnetic field emitted from the line conductor of the I-MLIN having the similar configuration as that of the embodiment of FIG. 1. This figure also indicates a section perpendicular to the track-width direction of the thin-film magnetic head.

In the figure, reference numeral 90 denotes a line conductor, 91 denotes a ground conductor corresponding to the magnetic disk 10 in the above-mentioned embodiment, and 92 and 93 denote grounded conductors corresponding to the main pole layer $31b_1$ and the auxiliary pole layer $31b_5$ in the above-mentioned embodiment, respectively. As will be understood form the figure, strong magnetic field is intensively emitted from two corners 90a and 90b of the line conductor 90 having a rectangular shape, which are opposed to the ground conductor 91. This is because the current distribution in the line conductor is not uniform but the current intensively gathers on the angled corners.

However, there is no proportional relationship between a distance between these two corners 90a and 90b and an intensity of the magnetic field applied to the ground conductor 91 or the magnetic disk. In case that the distance between the two corners 90a and 90b is long, since the magnetic fields emitted from these corners 90a and 90b are not synthesized with each other, the intensity of the magnetic field applied to the ground conductor 91 or the magnetic disk decreases in response to increase in the distance between the corners. Therefore, when the line conductor 90 has a flat shape as shown in FIG. 8a, the greater in the flatness degree namely the smaller in the aspect ratio B/A, the smaller in the magnetic field applied to the ground conductor 91 or the magnetic disk. In case that the distance between the two corners 90a and 90b is short, when the distance between the corners is less than a certain value, since it is equivalent to exist only one corner, the intensity of the magnetic field applied to the ground conductor 91 or the magnetic disk is kept constant irrespective of the distance. Therefore, when the line conductor 90 has a vertically long shape as shown in FIG. 8b, the magnetic field applied to the ground conductor 91 or the magnetic disk is kept constant if the aspect ratio B/A becomes larger than a certain constant value. In case that the distance between the two corners 90a and 90b is a middle value, because the magnetic field is synthesized or canceled to each other depending upon the distance, the magnetic field intensity changes depending upon the distance.

Figure 10:
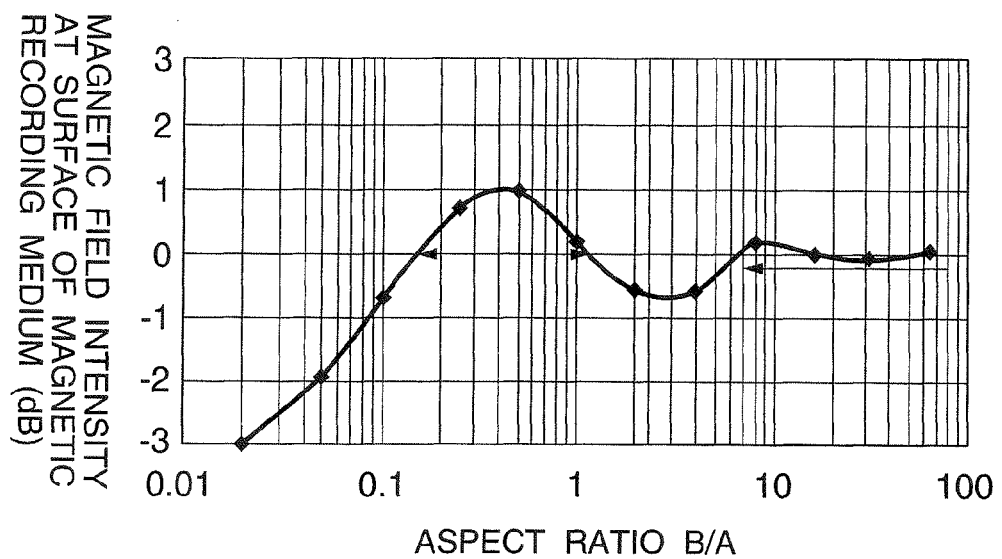
FIG. 10 is a graph illustrating a simulated result of a relationship between the aspect ratio B/A of the line conductor and a magnetic field intensity at surface of the magnetic recording medium.
Figure 11:
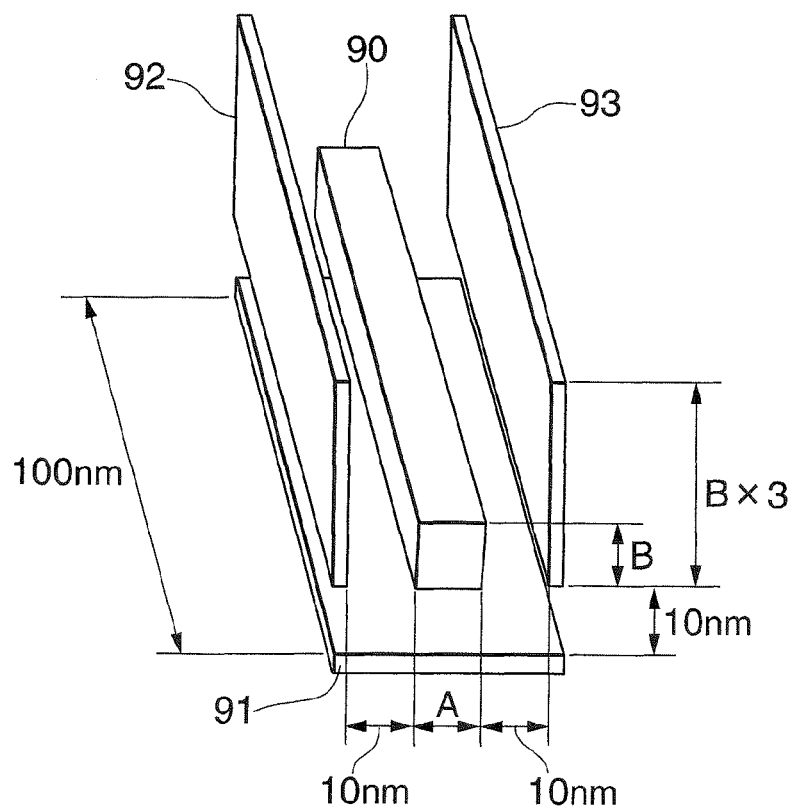
FIG. 11 is a view illustrating the structure and the size of I-MLIN used in the simulation of FIGS. 9 and 10.

FIG. 10 illustrates a simulated result of a relationship between the aspect ratio B/A of the line conductor and a magnetic field intensity at surface of the magnetic recording medium, and FIG. 11 illustrates the structure and the size of I-MLIN used in the simulation of FIGS. 9 and 10.

With respect to an I-MLIN with the structure and size shown in FIG. 11, the magnetic field was obtained in simulation by varying the aspect ratio B/A of the line conductor 90. That is, in this simulation, the line conductor 90 has a length A in a lateral direction, which is in parallel with the ABS and perpendicular to the track-width direction, a length B in a longitudinal direction, which is perpendicular to the ABS, and a length of 100 nm along the track-width direction. Each of the grounded conductors 92 and 93 has a length 3B in the longitudinal direction, and a length of 100 nm along the track-width direction. The ground conductor 91 has a separation gap of 10 nm with the conductors 92 and 93, which corresponds to a flying height. A separation gap between the line conductor 90 and each of the conductors 92 and 93 is 10 nm.

The result of this simulation is shown in Table 1 and FIG. 10. In FIG. 10, a magnetic field intensity shown in the longitudinal axis corresponds to a relative magnetic field intensity shown in Table 1, indicated in decibel where a magnetic field intensity at the aspect ratio B/A of 64 in which the magnetic field intensity is converged and saturated, is defined as 0 dB.

TABLE 1

| Aspect Ratio B/A | Magnetic Field Intensity | Relative Magnetic Field Intensity (dB) |
|---|---|---|
| 0.01 | 0.685 | −3.23392 |
| 0.02 | 0.706 | −2.97163 |
| 0.05 | 0.796 | −1.92947 |
| 0.10 | 0.920 | −0.67197 |
| 0.25 | 1.080 | 0.720747 |
| 0.50 | 1.110 | 0.958732 |
| 1 | 1.020 | 0.224276 |
| 2 | 0.930 | −0.57807 |
| 4 | 0.930 | −0.57807 |
| 8 | 1.010 | 0.13870 |
| 16 | 0.993 | −0.00874 |
| 32 | 0.988 | −0.05259 |
| 64 | 0.994 | 0 |

As will be understood from FIG. 10, the relative magnetic field intensity is equal to or higher than its convergent level within the region shown by arrows, that is, within a region where the aspect ratio B/A is from 0.15 to 1.2 or a region where the aspect ratio B/A is 7 or more. Therefore, an appropriate flatness degree of the line conductor 38 (90) can obtained by determining the aspect ratio of the line conductor 38 (90) in this region, so that a microwave can be very efficiently and intensively applied to the magnetic disk 10 (91). Also, because the microwave radiator has a MLIN function, electrical force lines from the line conductor 38 (90) directly return to the magnetic disk 10 (91), which is a ground conductor, resulting that substantially all the microwave power converted into the electrical field/magnetic field can be applied to the magnetic disk 10 (91). Furthermore, because of the I-MLIN structure, the electrical force lines are hardly emitted at all from the top surface of the line conductor 38 (90) and, even if emitted, the emitted electrical force lines are applied to the magnetic disk 10 (91), which is the ground conductor, without advancing in the backside direction of the substrate. Also, since there exists only air between the line conductor 38 (90) and the magnetic disk 10 (91), which is a ground conductor, a dielectric loss becomes very small in comparison with that there exists a dielectric material there between. Of course, according to the present invention, it is possible to precisely write data on the magnetic recording medium having a large coercive force without performing so-called thermal assisting or heating.

Figure 12:
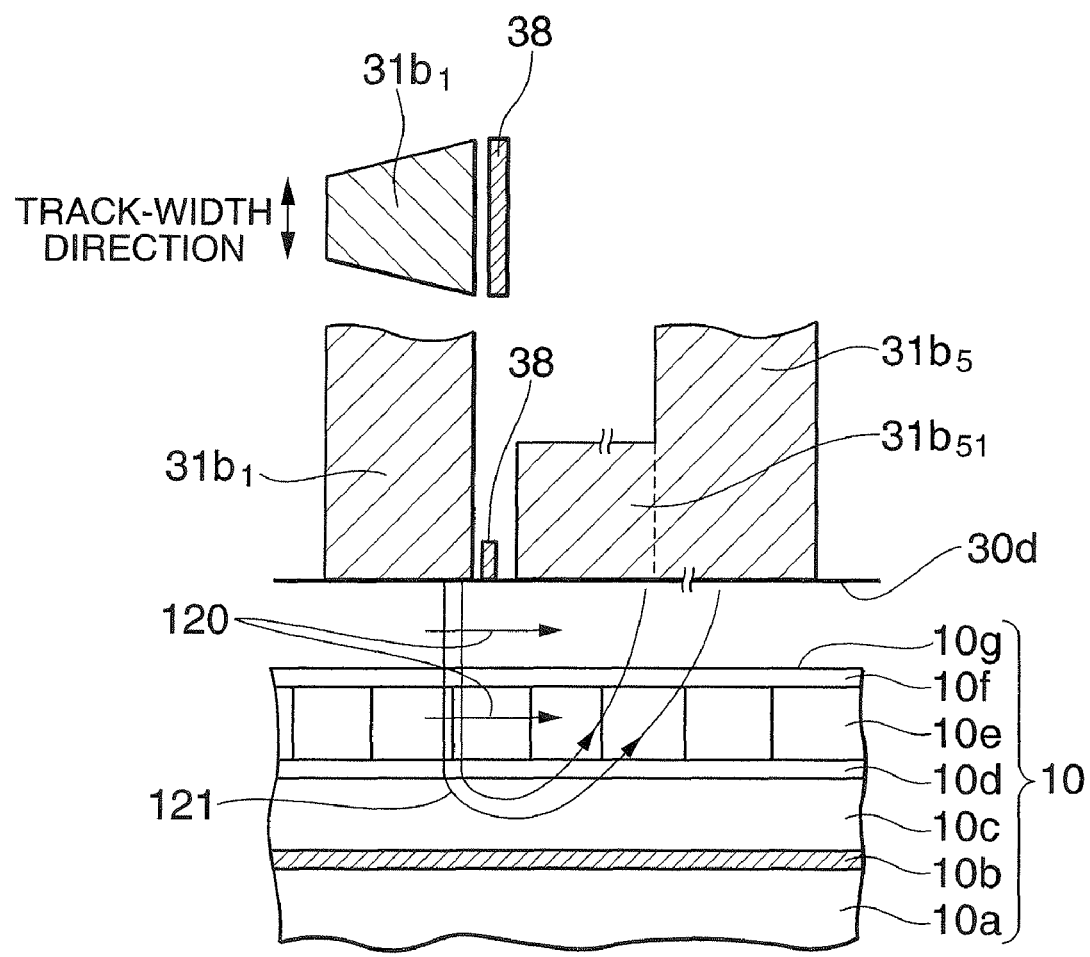
FIG. 12 is a sectional view illustrating the principle of a magnetic recording scheme according to the present invention and a head model in the embodiment of FIG. 1.

FIG. 12 illustrates the principle of the magnetic recording scheme according to the present invention and a head model in this embodiment.

First, with reference to this figure, the structure of the magnetic disk 10 is described. This magnetic disk 10 is a perpendicular magnetic recording type and has a multi-layered structure sequentially stacking, on a disk substrate 10a, a magnetization orienting layer 10b, a soft magnetic backing layer 10c that functions as a part of a magnetic flux loop path, an intermediate layer 10d, a magnetic recording layer 10e and a conductive protection layer 10f. In addition to the disk substrate 10a, all layers of the magnetic disk 10 are made of conductive material.

The magnetization orienting layer 10b provides a magnetic anisotropy in the track-width direction to the soft magnetic backing layer 10c so that the magnetic domain structure in the soft magnetic backing layer 10c is stabilized and a spiky noise on the reproduced output is suppressed. The intermediate layer 10d contributes as an under layer for controlling orientation of magnetization and a particle diameter in the magnetic recording layer 10e.

The disk substrate 10a is made of Al alloy coated by nickel phosphorus (NiP) or of silicon (Si) for example. The magnetization orienting layer 10b is made of an anti-ferromagnetic material such as PtMn for example. The soft magnetic backing layer 10c is formed from a single layer of a soft magnetic material such as cobalt (Co) family amorphous alloy represented by cobalt zirconium niobium (CoZrNb), iron (Fe) alloy or soft magnetic ferrite for example, or from a multilayer of soft magnetic film/nonmagnetic film. The intermediate layer 10d is made of a nonmagnetic material such as Ru alloy for example. However, this intermediate layer 10d may be made of other nonmagnetic metal material or alloy, or low permeability alloy if it is possible to control the perpendicular magnetic anisotropy in the magnetic recording layer 10e. The protection layer 10f is formed using a CVD method from carbon (C) for example.

The magnetic recording layer 10e is made of cobalt chrome platinum (CoCrPt) family alloy, CoCrPt—$SiO_2$, iron platinum (FePt) family alloy or artificial lattice multilayer of CoPt/palladium (Pd) family for example. It is desired that the perpendicular magnetic anisotropy in this magnetic recording layer 10e is adjusted to for example $1 \times 10^6$ erg/cc (0.1 J/m$^3$) or more to restrain thermal fluctuation in magnetization. In this case, the coercivity of the magnetic recording layer 10e becomes about 5 kOe (400 kA/m) or more for example. The ferromagnetic resonance frequency $F_R$ of this magnetic recording layer 10e is an inherent value determined depending upon a shape and size of particles and constituent elements of this magnetic recording layer 10e, and is about 1-15 GHz. This ferromagnetic resonance frequency $F_R$ may exist only one, or more than one in case of spin wave resonance.

Hereinafter, the principle of the magnetic recording scheme according to the present invention will be described with reference to FIG. 12. By feeding a microwave excitation current through the I-MLIN, electrical flux lines toward the surface of the magnetic disk 10 are produced, and thus a resonance magnetic field 120 along a track direction in-plane or substantially in-plane of the surface of the magnetic disk, which direction is perpendicular to that of the electrical flux lines, is radiated. Since the magnetic field 120 is a high frequency flux in the microwave frequency band, having a frequency of the resonance magnetic field equal to or in a range near the ferromagnetic resonance frequency $F_R$ of the magnetic recording layer 10e of the magnetic disk 10, it is possible to effectively reduce the coercivity of the magnetic recording layer 10e. As a result, the intensity of the write magnetic field 121 necessary for writing in a direction perpendicular to or substantially perpendicular to the layer surface of the magnetic recording layer 10e can be extremely reduced. In other words, magnetization inversion easily occurs by reducing the coercivity, it will be possible to perform effective writing using a low magnetic field.

In fact, by applying a resonance magnetic field with the ferromagnetic resonance frequency $F_R$ of the magnetic recording layer 10e, it is possible to reduce the perpendicular write magnetic field that can inverse the magnetization in the magnetic recording layer 10e by about 40%, that is, to about 60% of the original perpendicular write magnetic field. In other words, in case that the coercivity of the magnetic recording layer 10e before applying the resonance magnetic field is about 5 kOe (400 kA/m), if a resonance magnetic field in a direction of in-plane of the magnetic recording layer 10e, with the ferromagnetic resonance frequency $F_R$ of this magnetic recording layer 10e, the effective coercivity can be reduced to about 2.4 kOe (192 kA/m).

The intensity of the resonance magnetic field is preferably in a range of about 0.1-0.2 $H_k$, where $H_k$ is an anisotropy magnetic field of the magnetic recording layer 10e, and the frequency of the resonance magnetic field is preferably in a range of about 1-15 GHz.

FIG. 13 schematically illustrates an electrical configuration of the magnetic disk drive apparatus in this embodiment.

In the figure, reference numeral 11 denotes the spindle motor for driving the magnetic disk 10 to rotate about the rotation shaft, 130 denotes a motor driver for the spindle motor 11, 131 denotes a VCM driver for the VCM 17, 132 denotes a hard disk controller (HDC) for controlling the motor driver 130 and the VCM driver 131 in accordance with instructions from a computer 133, 134 denotes a read/write IC circuit including a head amplifier 134a for the thin-film magnetic head 13 and a read/write channel 134b, 135 denotes an excitation current supply circuit for providing a microwave excitation signal and a DC excitation current, and 136 denotes a head element wiring member for feeding a write current to the write head element of the thin-film magnetic head 13 and for feeding a constant current to the read head element to pick-up a read output voltage there from, respectively. One output terminal of the excitation current supply circuit 135 is connected to the line conductor 38 of the thin-film magnetic head 13 through the excitation current wiring member 22 and the other output terminal of the circuit 95 is grounded. As mentioned before, the magnetic disk 10 is grounded through the spindle motor 11 and else.

The read, write and resonance control circuit 19 shown in FIG. 1 is mainly configured by the aforementioned HDC 132, computer 133, read/write IC circuit 134 and the excitation current supply circuit 135.

According to this embodiment as aforementioned, since the aspect ratio B/A of the line conductor is set within a region from 0.15 to 1.2 or a region of 7 or more, an appropriate flatness degree of the line conductor can obtained resulting that a microwave can be very efficiently and intensively applied to the magnetic disk. Of course, according to this embodiment, a data signal can be precisely written onto the magnetic disk with a large coercivity without performing so-called thermal assisting or heating.

In this embodiment, particularly, because the microwave radiator is configured by the I-MLIN, behavior of a return of the electrical flux lines radiated from the line conductor differs from that in the CPW. Namely, in the CPW, the return of the electrical flux lines radiated from the central conductor will be come back and terminated at the ground conductors arranged lateral sides of the central conductor. Contrary to this, in the I-MLIN, the return of the electrical flux lines radiated from the line conductor 38 will be directly applied to and terminated at the magnetic disk 10 or the ground conductor faced to the line conductor 38. Thus, according to this embodiment, substantially all of the microwave power converted in the electrical field/magnetic field can be applied to the magnetic disk 10. Namely, strong uniform radiation of electrical field/magnetic field can be applied to the magnetic disk 10 without producing a weak radiation at its middle region. Further, according to this embodiment, since the return of the electrical flux lines is not applied to in parallel but is applied to substantially perpendicular to the surface of the magnetic disk, the direction of the magnetic field becomes in parallel with the surface of the magnetic disk and therefore the intensity of the write magnetic field necessary for writing in a direction perpendicular to or substantially perpendicular to the layer surface of the magnetic recording layer can be extremely reduced. In addition, thanks to the I-MLIN, the electrical flux lines from the line conductor 38 do not go round to the back of the substrate but substantially all of them are applied to the magnetic disk 10 namely the ground conductor. Also, in this case, since there exists only air between the line conductor 38 and the magnetic disk 10 namely the ground conductor, a dielectric loss becomes very small in comparison with the case where a dielectric material exists there between.

Furthermore, in the write head element with a perpendicular magnetic recording structure as in this embodiment, because the strongest write magnetic field is produced at the end edge of the top end section of the main pole layer near the auxiliary pole layer, if the line conductor 38 is arranged between the main pole layer and the auxiliary pole layer, the microwave band resonance magnetic field can be more effectively applied to the magnetic disk 10.

It will be noted that, according to the aforementioned magnetic recording scheme, a data signal can be precisely written onto a magnetic disk with a large coercivity without performing so-called thermal assisting or heating. Since such magnetic recording can be realized without adding any special high burden element such as an electron emitting source or a laser light source to the thin-film magnetic head, a downsized and low-cost thin-film magnetic head can be expected.

In a modification of this embodiment, the line conductor may be arranged on the other side of the main pole layer with respect to the auxiliary pole layer. However, in this case, because the line conductor is deviated from the position at which the strongest write magnetic field is produced, the effect of application of the microwave band resonance magnetic field will be lowered than that in the aforementioned embodiment.

The thin-film magnetic head according to the present invention is not limited to the aforementioned structure but it is apparent that various structures can optionally adopted for the thin-film magnetic head.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A thin-film magnetic head having microwave magnetic exciting function, comprising:

a write magnetic field production means for producing, in response to a write signal, a write magnetic field to be applied into a magnetic recording medium;

a line conductor of a microwave radiator of a plane-structure type, formed independent from said write magnetic field production means, for radiating, by feeding there through a microwave excitation current, a microwave band resonance magnetic field with a frequency equal to or in a range substantially at a ferromagnetic resonance frequency $F_R$ of said magnetic recording medium; and two conductors separated from said line conductor in a direction perpendicular to a track-width direction of said thin-film magnetic head and parallel to an air bearing surface of said thin-film magnetic head, said microwave radiator being an inverted micro strip waveguide having said line conductor and a ground conductor constituted by said magnetic recording medium, a section of said line conductor, perpendicular to the track-width direction, having a rectangular shape, an aspect ratio B/A being within a region from 0.15 to 1.2 or within a region of 7 or more, where A is a length in a lateral direction of said line conductor, which is in parallel with the air bearing surface and perpendicular to the track-width direction, and B is a length in a longitudinal direction of said line conductor, which is perpendicular to the air bearing surface.

2. The thin-film magnetic head as claimed in claim 1, wherein said thin-film magnetic head further comprises a write head element with a perpendicular magnetic recording structure having a main pole, an auxiliary pole and a coil means wound to pass through between said main pole and said auxiliary pole, wherein said write magnetic field production means includes said coil means, wherein said line conductor of said microwave radiator is arranged between said main pole and said auxiliary pole, and wherein said two conductors include said main pole and said auxiliary pole.

3. The thin-film magnetic head as claimed in claim 1, wherein said thin-film magnetic head further comprises a write head element with a perpendicular magnetic recording structure having a main pole, an auxiliary pole and a coil means wound to pass through between said main pole and said auxiliary pole, wherein said write magnetic field production means includes said coil means, wherein said line conductor of said microwave radiator is arranged on the other side of said main pole with respect to said auxiliary pole, and wherein one of said two conductors includes said auxiliary pole.

4. A magnetic recording and reproducing apparatus with a thin-film magnetic head having microwave magnetic exciting function, comprising:
a magnetic recording medium having a magnetic recording layer;
a thin-film magnetic head having a write magnetic field production means for producing, in response to a write signal, a write magnetic field to be applied into said magnetic recording layer of said magnetic recording medium, a line conductor of a microwave radiator of a plane-structure type, formed independent from said write magnetic field production means, for radiating, by feeding there through a microwave excitation current, a microwave band resonance magnetic field with a frequency equal to or in a range substantially at a ferromagnetic resonance frequency $F_R$ of said magnetic recording layer of said magnetic recording medium, and two conductors separated from said line conductor in a direction perpendicular to a track-width direction of said thin-film magnetic head and parallel to an air bearing surface of said thin-film magnetic head, said microwave radiator being an inverted micro strip waveguide having said line conductor and a ground conductor constituted by said magnetic recording medium, a section of said line conductor, perpendicular to the track-width direction, having a rectangular shape, an aspect ratio B/A being within a region from 0.15 to 1.2 or within a region of 7 or more, where A is a length in a lateral direction of said line conductor, which is in parallel with the air bearing surface and perpendicular to the track-width direction, and B is a length in a longitudinal direction of said line conductor, which is perpendicular to the air bearing surface;

a write signal supply means for supplying the write signal to said write magnetic field production means; and
a microwave excitation current supply means for supplying the microwave excitation current to said microwave radiator.

5. The magnetic recording and reproducing apparatus as claimed in claim 4, wherein said thin-film magnetic head further has a write head element with a perpendicular magnetic recording structure having a main pole, an auxiliary pole and a coil means wound to pass through between said main pole and said auxiliary pole, wherein said write magnetic field production means includes said coil means, wherein said at least line conductor of said microwave radiator is arranged between said main pole and said auxiliary pole, and wherein said two conductors include said main pole and said auxiliary pole.

6. The magnetic recording and reproducing apparatus as claimed in claim 4, wherein said thin-film magnetic head further has a write head element with a perpendicular magnetic recording structure having a main pole, an auxiliary pole and a coil means wound to pass through between said main pole and said auxiliary pole, wherein said write magnetic field production means includes said coil means, wherein said at least line conductor of said microwave radiator is arranged on the other side of said main pole with respect to said auxiliary pole, and wherein one of said two conductors includes said auxiliary pole.

7. The magnetic recording and reproducing apparatus as claimed in claim 4, wherein one output terminal of said microwave excitation current supply means is connected to said line conductor of said microwave radiator, and wherein the other output terminal of said microwave excitation current supply means is connected to said ground conductor constituted by said magnetic recording medium through a resistor.

8. The magnetic recording and reproducing apparatus as claimed in claim 4, wherein one end of said line conductor of said microwave radiator is grounded or terminated by a resistor element having an impedance equivalent to the characteristic impedance of said microwave radiator, and wherein the other end of said line conductor is connected to said microwave excitation current supply means.

9. The magnetic recording and reproducing apparatus as claimed in claim 4, wherein said apparatus further comprises a DC excitation current supply means for supplying a DC excitation current to said microwave radiator.

10. The magnetic recording and reproducing apparatus as claimed in claim 4, wherein the write magnetic field is applied to said magnetic recording layer of said magnetic recording medium in a direction perpendicular or substantially perpendicular to a layer plane of said magnetic recording layer, and wherein the resonance magnetic field runs through said magnetic recording layer in a direction parallel or substantially parallel to the layer plane of said magnetic recording layer.

* * * * *